(12) United States Patent
Piraube et al.

(10) Patent No.: US 12,138,744 B2
(45) Date of Patent: Nov. 12, 2024

(54) METHODS AND SYSTEMS FOR PRODUCING OPHTHALMIC LENSES BACKGROUND

(71) Applicant: Essilor International, Charenton-le-pont (FR)

(72) Inventors: Sébastien Piraube, Dallas, TX (US); Bruce Taylor, Dallas, TX (US); Brad Gelb, Dallas, TX (US); Mark Kaluza, Dallas, TX (US); Peter Hones, Dallas, TX (US); Fred Adolfo, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 1149 days.

(21) Appl. No.: 16/760,152

(22) PCT Filed: Nov. 7, 2018

(86) PCT No.: PCT/EP2018/080514
§ 371 (c)(1),
(2) Date: Apr. 29, 2020

(87) PCT Pub. No.: WO2019/092045
PCT Pub. Date: May 16, 2019

(65) Prior Publication Data
US 2020/0338685 A1 Oct. 29, 2020

(30) Foreign Application Priority Data
Nov. 8, 2017 (EP) .................................... 17306548

(51) Int. Cl.
*B24B 9/14* (2006.01)
*B24B 13/00* (2006.01)
(Continued)

(52) U.S. Cl.
CPC .......... *B24B 9/148* (2013.01); *B24B 13/0012* (2013.01); *B24B 13/06* (2013.01);
(Continued)

(58) Field of Classification Search
CPC .... B24B 1/00; B24B 5/02; B24B 5/16; B24B 5/162; B24B 13/0006–0025;
(Continued)

(56) References Cited

U.S. PATENT DOCUMENTS 8,002,406 B2 * 8/2011 Arrigotti ................... B24B 1/00
264/1.32
8,007,102 B2 * 8/2011 De Gaudemaris ..... G02C 7/061
351/159.41

(Continued)

FOREIGN PATENT DOCUMENTS

| EP | 1 203 626 | 5/2002 |
|---|---|---|
| EP | 1 449 616 | 8/2004 |

(Continued)

OTHER PUBLICATIONS

International Search Report, PCT/EP2018/080514, dated Mar. 14, 2019.

(Continued)

*Primary Examiner* — Robert F Neibaur
(74) *Attorney, Agent, or Firm* — NIXON & VANDERHYE

(57) ABSTRACT

This disclosure includes methods and systems for producing ophthalmic lenses. Some methods include identifying a plurality of zones within a spatial representation of a lens blank, selecting, for each of the zones, one or more parameters for producing the lens, and producing the lens by removing material from the lens blank according to the one or more parameters of each of the zones.

20 Claims, 21 Drawing Sheets

(51) Int. Cl.
*B24B 13/06* (2006.01)
*G02C 7/06* (2006.01)
*G05B 19/042* (2006.01)

(52) U.S. Cl.
CPC ........... *G05B 19/042* (2013.01); *G02C 7/061* (2013.01); *G05B 2219/2627* (2013.01)

(58) Field of Classification Search
CPC .............. B24B 13/0037; B24B 13/005; B24B 13/0012; B24B 13/065; B24B 13/046; B24B 9/14; B24B 9/148; G02C 7/12; G02C 7/02; G02C 7/10; B29D 11/00–026
USPC .......................................... 451/5, 42, 43, 384
See application file for complete search history.

(56) References Cited

U.S. PATENT DOCUMENTS

| | | | | |
|---|---|---|---|---|
| 8,535,114 B2 * | 9/2013 | Miura | ................... | B24B 9/148 |
| | | | | 700/157 |
| 10,875,140 B2 * | 12/2020 | Spratt | ................... | B24B 13/06 |
| 2002/0160690 A1 * | 10/2002 | Miyazawa | ................ | B24B 1/00 |
| | | | | 451/5 |
| 2014/0016088 A1 | 1/2014 | De Rossi et al. | | |
| 2015/0338680 A1 * | 11/2015 | Spratt | .................... | G02C 7/024 |
| | | | | 351/159.76 |

FOREIGN PATENT DOCUMENTS

| | | | |
|---|---|---|---|
| EP | 3 002 114 | 4/2016 | |
| WO | 02/37168 A2 | 5/2002 | |
| WO | WO 02/247168 | 5/2002 | |
| WO | WO-2010051225 A1 * | 5/2010 | ....... B29D 11/00009 |
| WO | WO 2014/013072 | 1/2014 | |
| WO | WO 2017/067597 | 4/2017 | |

OTHER PUBLICATIONS

Office Action issued in Chinese Patent Application No. 201880071931.7 dated Oct. 28, 2022.

\* cited by examiner

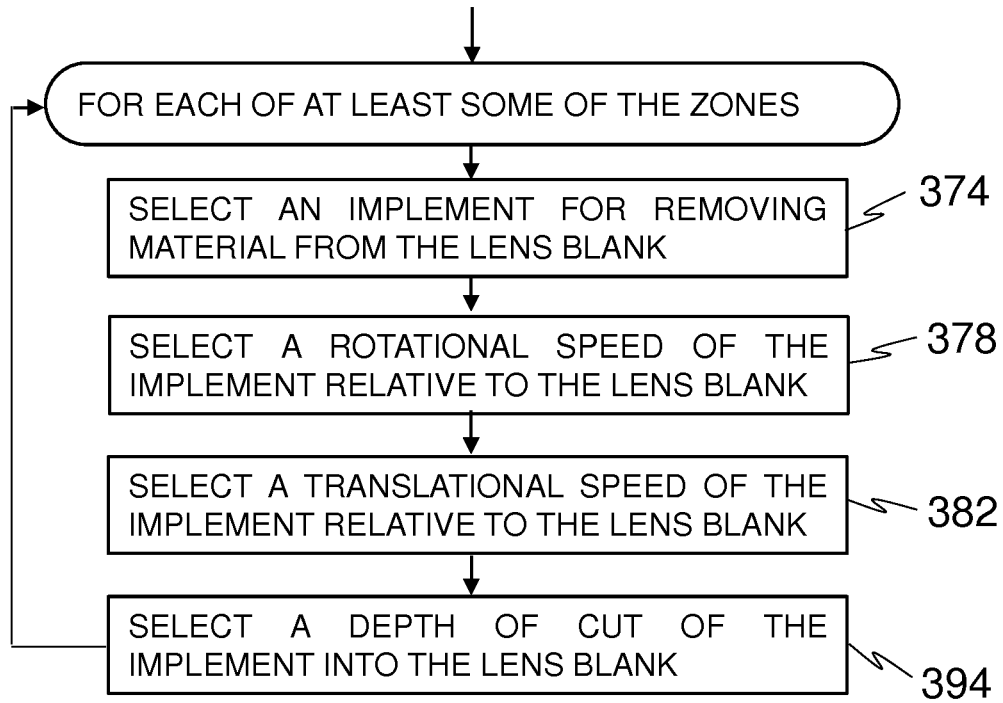
FIG. 17
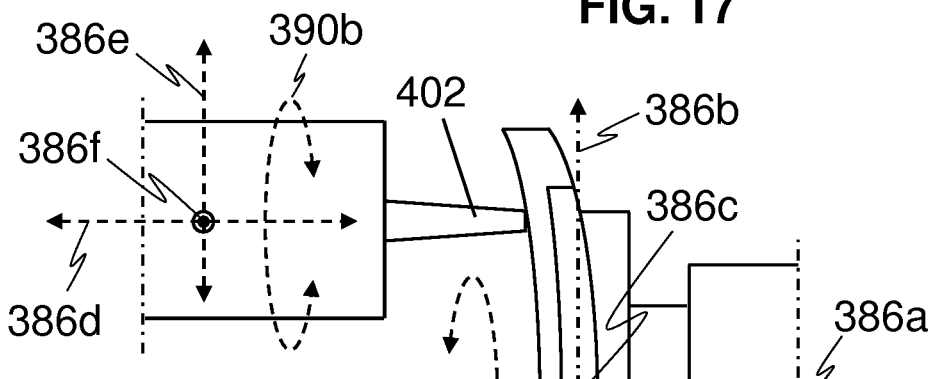
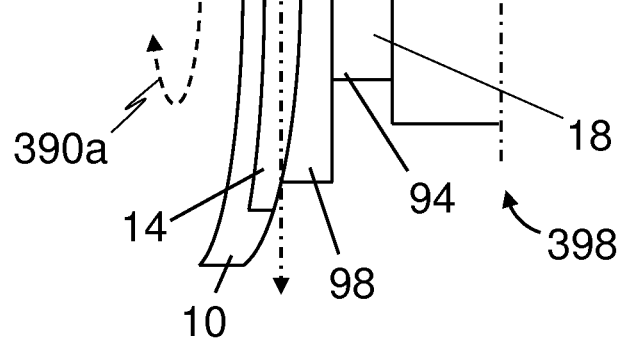
FIG. 18

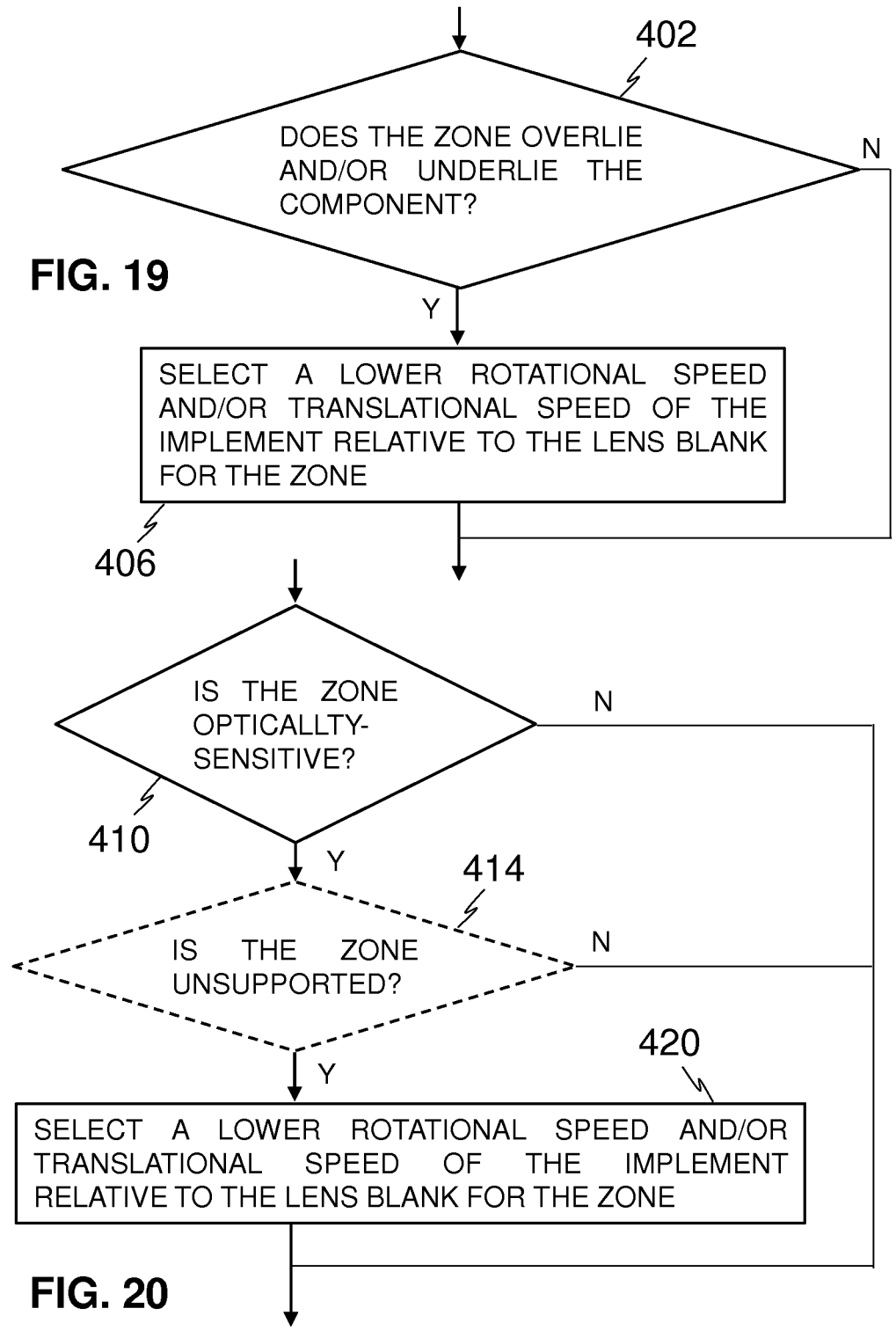

METHODS AND SYSTEMS FOR PRODUCING OPHTHALMIC LENSES

BACKGROUND

BACKGROUND

1. Field of Invention

The present invention relates generally to ophthalmic lenses, and more specifically, to methods and systems for producing ophthalmic lenses.

2. Description of Related Art

Typically, an ophthalmic lens is produced by machining a lens blank. Such machining can include, for example, surfacing, in which a generator is used to produce a front surface and/or a back surface of the lens, edging, in which an edger is used to shape the lens so as to fit into a frame, polishing, engraving, and/or the like. During such machining, the lens blank is typically supported on a block, which can be used to position the lens blank relative to the machining equipment (e.g., the generator, the edger, a polisher, an engraver, and/or the like).

In at least some of these machining steps, the machining equipment can. receive instructions indicative of parameter(s) for machining the lens blank and can machine the lens blank according to those parameter(s). For example, the generator may receive instructions indicative of a rotational speed and/or a translational speed for its cutting implement relative to the lens blank and may produce the front surface and/or the back surface of the lens using those speed(s). In some instances, such instructions include a reference to the parameter(s), which are actually stored in a memory of the machining equipment.

Traditional methods of preparing these instructions—such as selecting them from a predefined set—may fail to provide sufficient flexibility When selecting the parameter(s) for machining the lens blank. For example, such methods may not adequately account for the final lens shape, the position of the lens within the lens blank, the presence of component(s) (e.g., a polar film or wafer, a display, and/or a waveguide) within the lens, the position of optically-sensitive portions of the lens, the position of the block relative to the lens blank, and/or the like. As a result, it is not uncommon for two lenses that differ in one or more of these aspects to be produced using the same parameter(s). For further example, such methods may not adequately account for manufacturing preferences, such as a desired aesthetic and/or optical quality for portions of the lens outside of the final lens shape. This lack of flexibility, winch is itself a disadvantage, can lead to unnecessary increases in lens manufacturing times and costs, lower quality lenses, and/or the like.

SUMMARY

Embodiments of the present methods can be used to machine a lens blank to produce an ophthalmic lens more quickly, with less risk of defects in and/or undesirable damage to the lens, and/or having better aesthetic and/or optical quality when compared to traditional methods. Such advantages can be obtained, at least in part, by: (1) identifying a plurality of zones within a spatial representation of the lens blank and relative to the lens, such as, for example, zone(s) that: (a) are and/or are not supported by a blocking material; (b) are and/or are not bounded by a front thee or a back face of the lens; and/or (c) are and/or are not bounded by a portion(s) of the lens that are optically-sensitive (examples of which are provided below); (2) selecting, for each of the zones, one or more parameters for producing the lens, such as, for example: (a) an implement for removing material from the lens blank; (h) a rotational and/or translational speed of the implement relative to the lens blank; and/or (c) a depth of cut of the implement into the lens blank; and (3) producing the lens by removing material from the lens blank according to the one or more parameters for each of the zones. To illustrate, less aggressive parameters can be selected for zone(s) that are more important in terms of aesthetic and/or optical quality, such as zone(s) that are bounded by a front face or a back face of the lens and/or zone(s) that are bounded by portion(s) of the lens that are optically-sensitive, than for other zone(s). To further illustrate, less aggressive parameters can be selected for zone(s) that are more susceptible to undesirable damage during machining (e.g., vibration marks), such as zone(s) that are not supported by the blocking material, than for other zone(s). Thus, when removing material from the lens blank, less aggressive parameters can be used in certain zone(s) to promote aesthetic and/or optical quality, mitigate the risk of defects in and/or undesirable damage to the lens, and/or the like, and/or more aggressive parameters can be used in other zone(s) to decrease machining time for producing the lens.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10 percent.

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any foul: of include, such as "includes" and "including") are open-ended linking verbs. As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to Change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above, and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 17 is a flow chart showing methods for selecting, for each of at least some of the zones, at least one of the parameter(s) for producing the lens, including an implement for removing material from the lens blank, a rotational speed of the implement relative to the lens blank, a translational speed of the implement relative to the lens blank, and/or a depth of cut of the implement into the lens blank.

FIG. 18 depicts a lens generator that may be suitable for use in some of the present methods and systems.

FIG. 19-21 are flow charts showing methods for selecting, for at least one of the zones, at least one of the parameter(s) for producing the lens based on characteristic(s) of the zone.

DETAILED DESCRIPTION

Figure 1A:
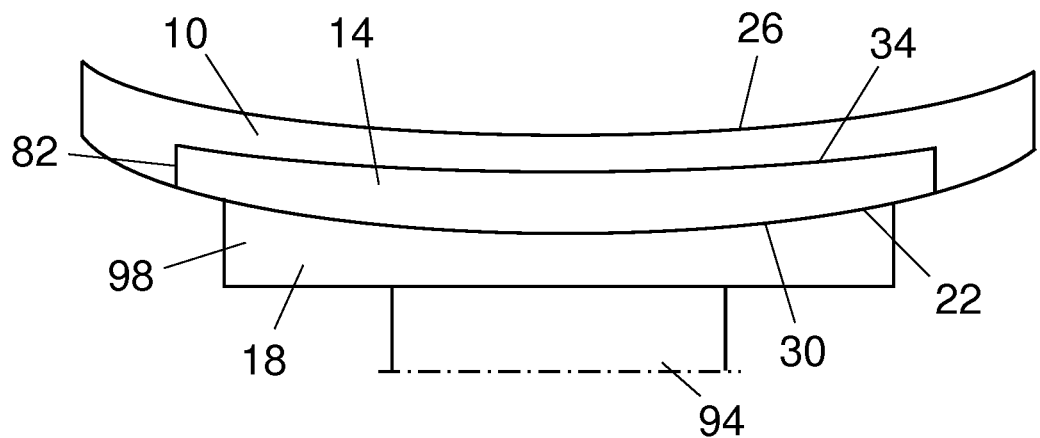
FIGS. 1A and 1B are side and top views, respectively, of a lens blank, a lens to be produced from the lens blank, and a block for supporting the lens blank during production of the lens, each of which is provided by way of illustration.
Figure 1B:
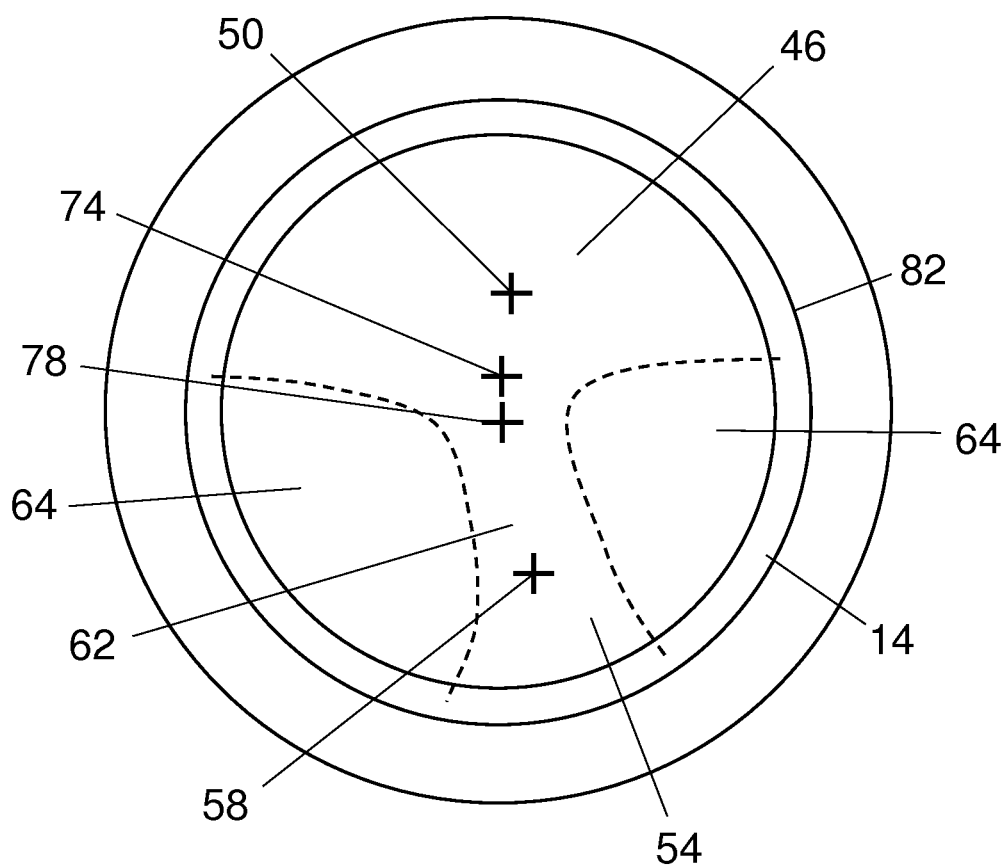

Provided to illustrate some of the present methods for producing an ophthalmic lens, FIGS. 1A and 1B depict a lens blank 10, a lens 14 to be produced from the lens blank, and a block 18 for supporting the lens blank during production of the lens. These structures are not limiting on the present methods, which can be used to process any suitable lens blank to produce any suitable lens using any suitable block.

Lens blank 10 comprises a piece of lens material that can be machined (e.g., surfaced, edged, polished, and/or the like) to produce lens 14. Such lens material can comprise, for example, a polymeric material (e.g., polycarbonate), glass, an organic material (e.g., CR-39 1.50 index, high index 1.67, or the like), or the like. Lens blank 10 can be a semi-finished lens blank, meaning a portion of a front face 22 or a back face 26 of the lens blank defines at least a portion of a front face 31) or a back face 34 of lens 14 to the extent that the portion of the lens blank face need not be surfaced (though it may be polished) during production of the lens. To illustrate using FIG. 1A, to this extent, a portion of front face 22 of lens blank 10 defines front face 30 of lens 14. Nevertheless, the present methods can be used to process lens blanks in which any portion of—including all of—each of a front face and a back face of the lens blank need be surfaced to produce a lens; some such lens blanks may be known as rough lens blanks.

Lens 14 can be a progressive lens. For example, lens 14 can include a distance vision portion 46 at which the power of the lens is equal to, or is within a threshold value of, a distance power of the lens (measured at a distance reference point 50 of the distance vision portion), a near vision portion 54 at which the power of the lens is, or is within a threshold value of, a near power of the lens (measured at a near reference point 58 of the near vision portion), and a progressive corridor 62 disposed between the distance vision portion and the near vision portion and along which the power of the lens transitions between the distance power and the near power. Lens 14 can further include lateral vision portions 64 disposed on opposing sides of progressive corridor 62. Of course, the present methods can be used to produce other types of lenses, including, for example, single vision, bifocal, trifocal, plano, and/or the like lenses. In lens 14, front face 30 is convex and back face 34 is concave; however, lenses producible with the present methods can have front faces that are, or include portion(s) that are, concave, convex, and/or planar, and back faces that are, or include portion(s) that are, concave, convex, and/or planar.

Lens 14 (as well as other lenses) can include a fitting point 74, which is a point on the lens that is used to position the lens relative to a wearer's eye, a prism reference point 78, which is a point on the lens where prism is to be measured, and/or the like. Reference point(s) of a lens (e.g., 14), such as a distance reference point, near reference point, fitting point, prism reference point, and/or the like, can be specified when the lens is designed. In some instances, one or more such reference points can be of a lens blank (e.g., 10) (e.g., in addition to, or in lieu of, of the lens).

Lens 14 includes an edge 82 that connects front face 30 and back face 34. Edge 82 can define a final shape of lens 14, which is a shape that corresponds to a frame within which the lens is to be placed. In lens 14 (and other lenses), edge 82 can be beveled, fluted, rounded, and/or the like and/or can define ridge(s), groove(s), and/or the like, whether to facilitate coupling of the lens to a frame, for aesthetic reasons, and/or the like.

To support lens blank 10 during production of lens 14, the lens blank can be attached to block 18. As shown, block 18 can include a block piece 94 and a blocking material 98 that contacts lens blank 10 and attaches the lens blank to the block piece. In some instances, lens blank 10 can include a protective coating, film, and/or tape (e.g., applied to its front face 22 or its back face 26), and blocking material 98 can contact the lens blank at the protective coating, film, and/or tape. Blocking material 98 can include any suitable blocking material, such as, for example, a metal alloy, an adhesive, and/or the like. During machining of lens blank 10, block piece 94 can be coupled to machining equipment to facilitate positioning of the lens blank relative to the machining equipment, manipulation of the lens blank with the machining equipment, and/or the like.

Figure 2:
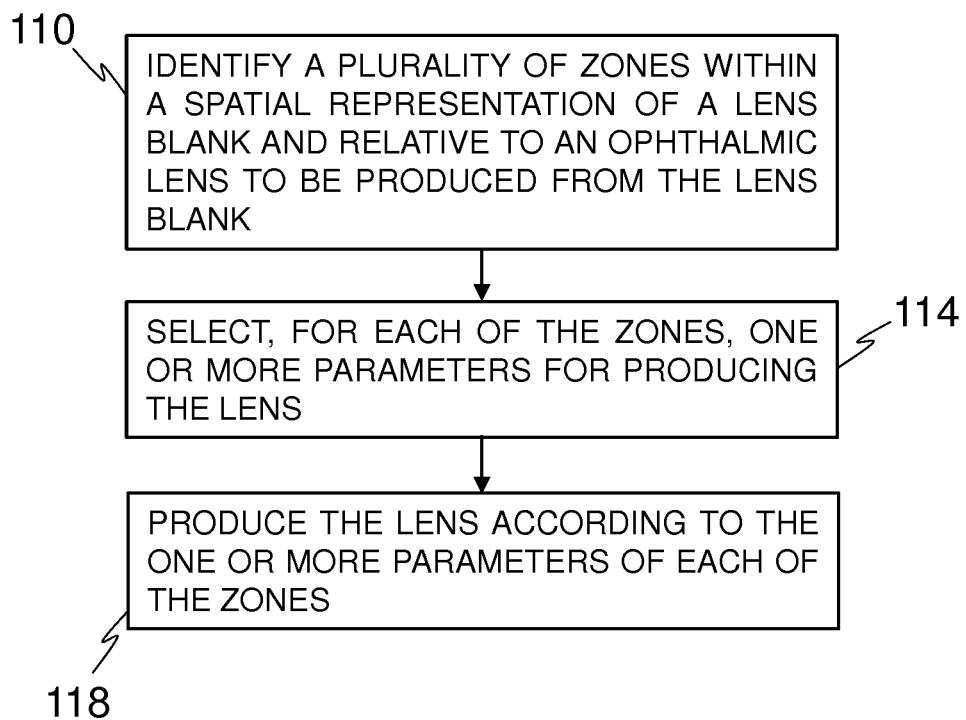
FIG. 2 is a flow chart showing methods for producing an ophthalmic lens, which include: (1) identifying zones within a spatial representation of a lens blank from which the lens is to be produced; (2) selecting, for each of the zones, one or more parameters for producing the lens; and (3) producing the lens according to the selected parameters.

Referring now to FIG. 2, shown are some of the present methods for producing an ophthalmic lens. As an overview, the present methods can include a step 110 of identifying a plurality of zones within a spatial representation of a lens blank (e.g., 10) and relative to an ophthalmic lens (e.g., 14) to be produced from the lens blank, a step 114 of selecting, for each of the zones, one or more parameters for producing the lens, and a step 118 of producing the lens according to the one or more parameters of each of the zones—each of these steps is described in detail below. For each of at least one of the front face and the back face of the lens, the zones comprise an interior zone bounded by an interior portion of the face and a peripheral zone bounded by a periphery of the face that surrounds the interior portion of the face. The zones further comprise a waste zone that is bounded by neither the front face nor the back face of the lens.

Beginning with step 110, the spatial representation of the lens blank can be any spatial representation, so long as it includes data indicative of the shape of the lens blank, the shape of the lens, and the position of the lens within the lens blank. For example, in the spatial representation, the lens blank, the lens, and/or the portion of the lens blank to be machined (the portion of the lens blank that is not the lens) ("machined portion") can each be represented by one or more of its boundaries for the lens blank, a from face (e.g., 22), a back face (e.g., 26), and an edge that connects the front face and the back face, for the lens, a front face (e.g., 30), a back face (e.g., 34), and an edge (e.g., 82) that connects the front face and the back face, and, for the machined portion, the boundaries (or portions thereof) of the lens blank and the lens that are not shared by both the lens blank and the lens. Such boundaries can each be represented by an array of points that each lie on the boundary, polygons having vertices at such points (e.g., as in certain computer-aided design (CAD) file formats), and/or equations (e.g., spline(s), which may intersect such points) that each define or approximate at least a portion of the boundary. For further example, in the spatial representation, the lens blank, the lens, and/or the machined portion can each be represented by its volume, which, in turn, can be represented by an array of points, each of which lies either on one of its boundaries or within its boundaries and/or polyhedrons having vertices at such points (e.g., as in certain CAD file formats).

Figure 3A:
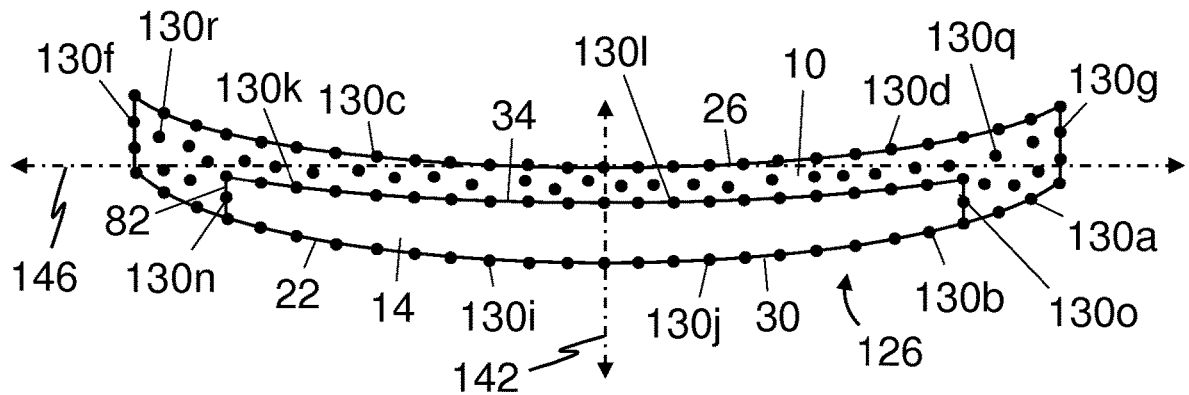
FIGS. 3A and 3B illustrate a spatial representation of the lens blank of FIGS. 1A and 1B.
Figure 3B:
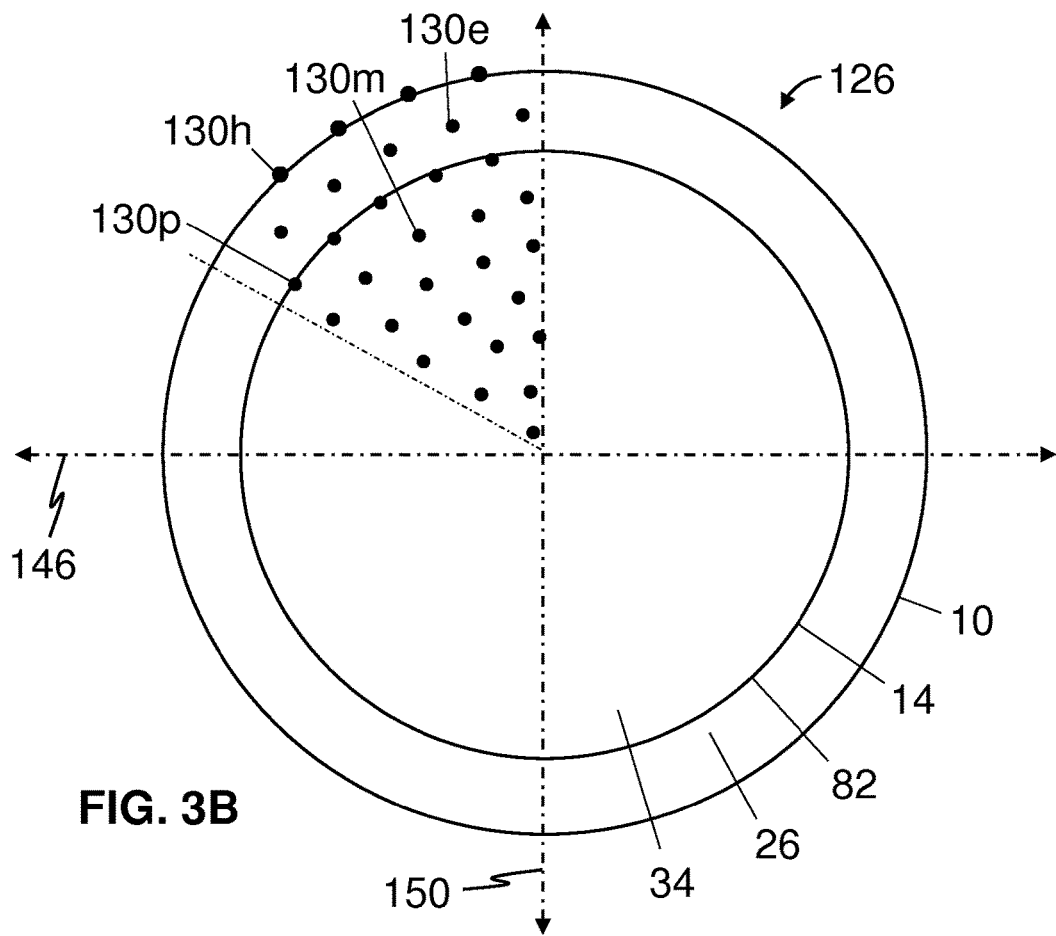

Provided by way of example, FIGS. 3A and 3B illustrate a spatial representation 126. In spatial representation 126, lens blank 10 can be represented by: (1) front face 22, which can be represented by an array of points including—amongst others—points 130a and 130b; (2) back face 26, which can be represented by an array of points including amongst others points 130c, 130d, and 130e; and/or (3) an edge that connects the front face and the back face, which can be represented by an array of points including amongst others-points 130f, 130g, and 130h. Similarly, lens 14 can be represented by: (1) front face 30, which can be represented by an array of points including amongst others points 130i and 130j, (2) back face 34, which can be represented by an array of points including-amongst others—points 130k, 130l, and 130m; and (3) edge 82, which can be represented at least by an array of points including—amongst others— points 130n, 130o, and 130p.

As shown, the machined portion can be represented by the boundaries of lens blank 10 and lens 14 that are not shared by the lens blank and the lens, including: (1) a portion of the lens blank's front face 22 that defines no portion of the lens's front face 30 (e.g., representable by an array of points including point 130a, but not point 130b); (2) the lens blank's back face 26; (3) the lens blank's edge; (4) the lens's edge 82; and (5) the lens's back face 34. In spatial representation 126, the machined portion can be represented by its volume, which, in turn, can be represented by an array of points that includes points that lie on one or more of its boundaries (e.g., points 130a, 130c, 130d, 130e, 130f, 130g, 130h, 130k, 130l, 130m, 130n, 130o, and 130p) as well as points that lie within its boundaries (e.g., points 130q and 130r).

To facilitate identification of zones within the spatial representation (described below), the points, polygons, polyhedrons, and/or equations that represent the lens blank, the lens, and/or the machined portion can be defined in the same reference frame. Provided by way of illustration, the reference frame can include a Z-axis (e.g., 142, FIG. 3A), which can be parallel to a rotational axis of a mandrel to which the lens blank will be secured during production of the lens, parallel to a longitudinal axis of a block (e.g., 18) (e.g., of a block piece 94 and/or a blocking material 98 thereof) that will support the lens blank during production of the lens, perpendicular to a cutting plane during production of the lens, parallel to an optical axis of the lens, perpendicular to a plane that is tangent to the lens blank and/or the lens at a reference point thereof (e.g., a prism reference point 78, a fitting point 74, or another reference point), and/or the like. The reference frame can further include an X-axis (e.g., 146, FIGS. 3A and 3B) that is perpendicular to the Z-axis, and a Y-axis (e.g., 150, FIG. 3B) that is perpendicular to each of the Z- and X-axes. At least one of the X- and Y-axes can extend through the edge of the lens blank and/or the edge of the lens at opposing sides thereof. The X-axis can align with the horizon of the lens and/or with the blocking meridian of the block determined by the location of fining centers or alignment grooves.

Figure 4:
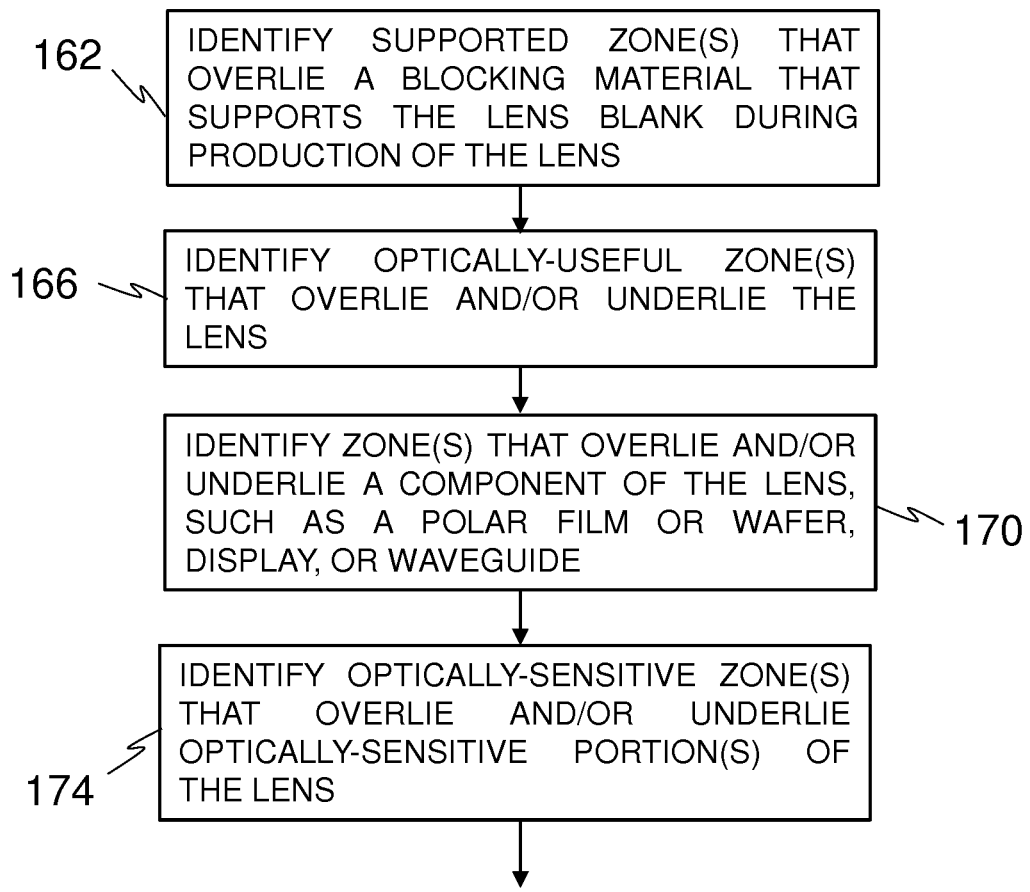
FIG. 4 is a flow chart showing methods for identifying at least one of the zones, including supported zone(s), optically-useful zone(s), zone(s) that overlie and/or underlie a component of the lens, and/or optically-sensitive zone(s).
Figure 5:
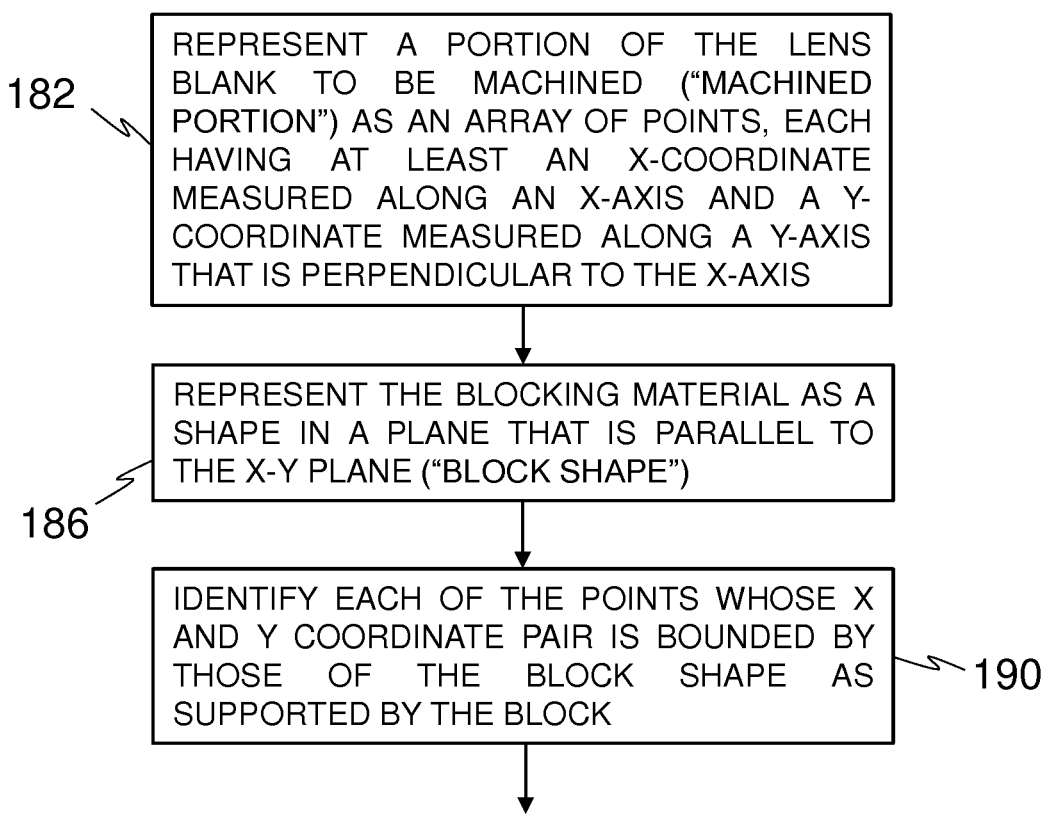
FIGS. 5 and 6 are flow charts showing methods for identifying supported zone(s).
Figure 6:
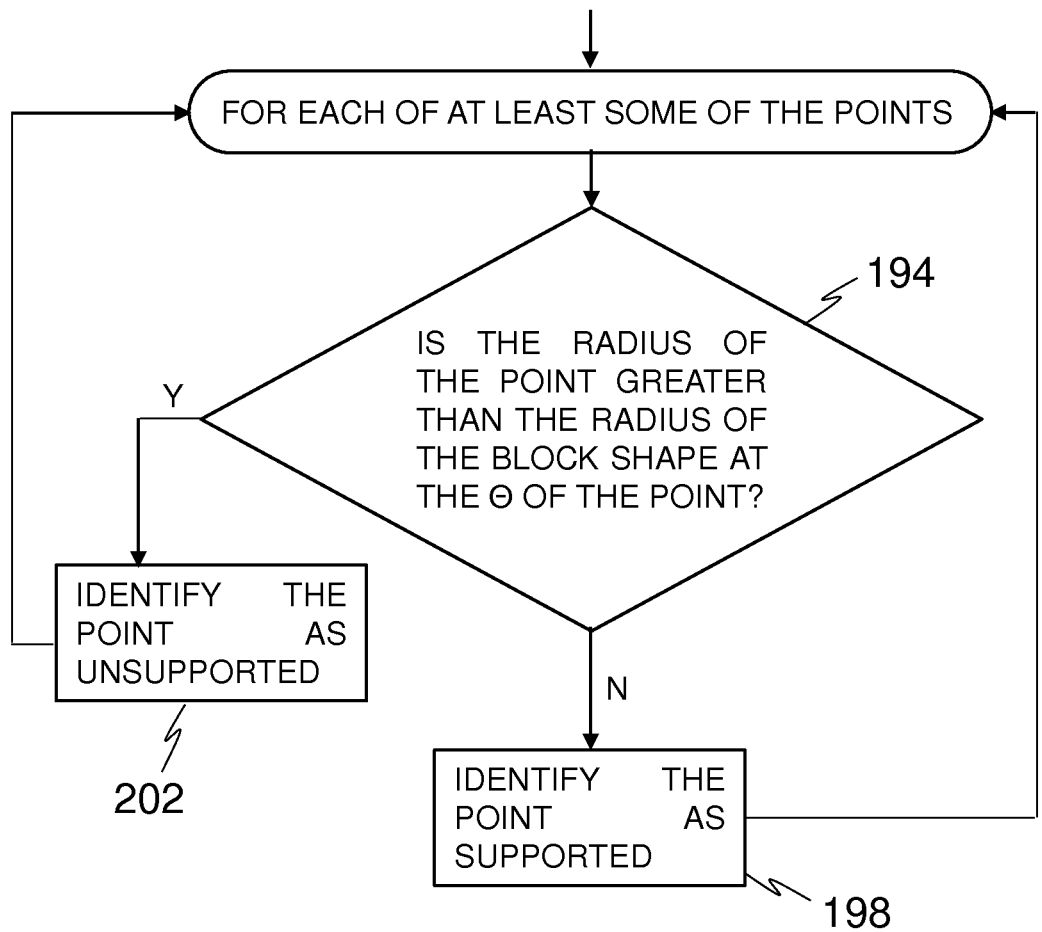

Referring additionally to FIG. 4, shown are some of the present methods for identifying the zones in step 110 (FIG. 2), which can include identifying: supported zone(s) (step 162), optically-useful zone(s) (step 166), zone(s) that overlie and/or underlie a component of the lens (step 170) and/or optically-sensitive zones (step 174), each of which is described below. One(s) of the zones that overlie and/or underlie the lens can each extend within the machined portion to the lens such that the zone is bounded by the front face or the back face of the lens.

Beginning with step 162, supported zone(s) can be identified as those that overlie the blocking material that supports the lens blank during production of the lens. A zone can overlie the blocking material if, for example, all or substantially all of (i.e., at least 90% of the volume of) the zone lies within a volume defined by: (1) a generatrix that is the surface of the blocking material that contacts the lens blank; and (2) a directrix that is the Z-axis. For further example, a zone can overlie the blocking material if a line that is parallel to the Z-axis and extends through the surface of the blocking material that contacts the tens blank also extends through the zone. As used herein, a zone need not be positioned vertically above a structure to "overlie" the structure (or be positioned vertically below the structure to "underlie" the structure). Supported zone(s) can be identified in any suitable fashion; the following description is provided solely by way of illustration.

Figure 7A:
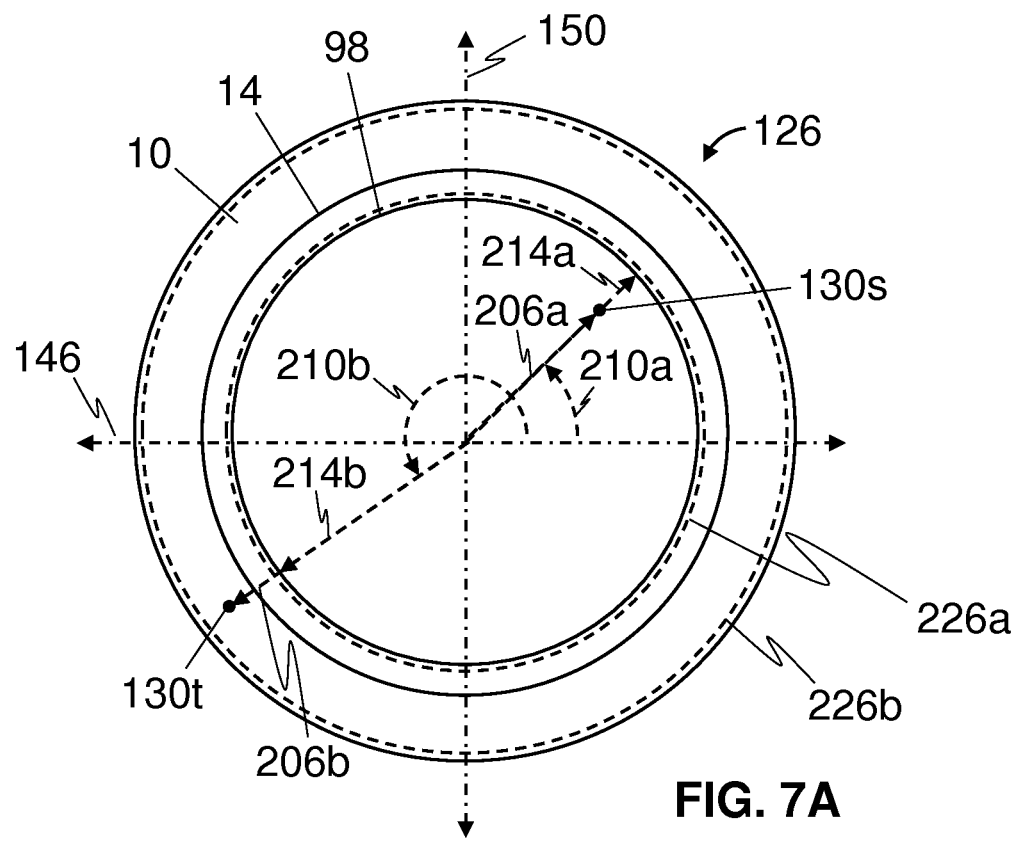
FIGS. 7A and 7B illustrate some Of the methods of FIGS. 5 and 6.
Figure 7B:
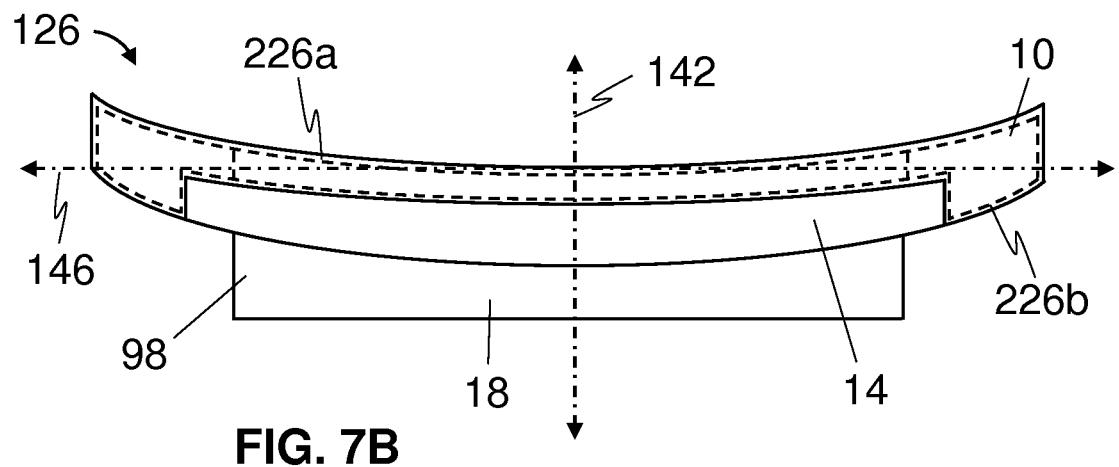
Figure 8:
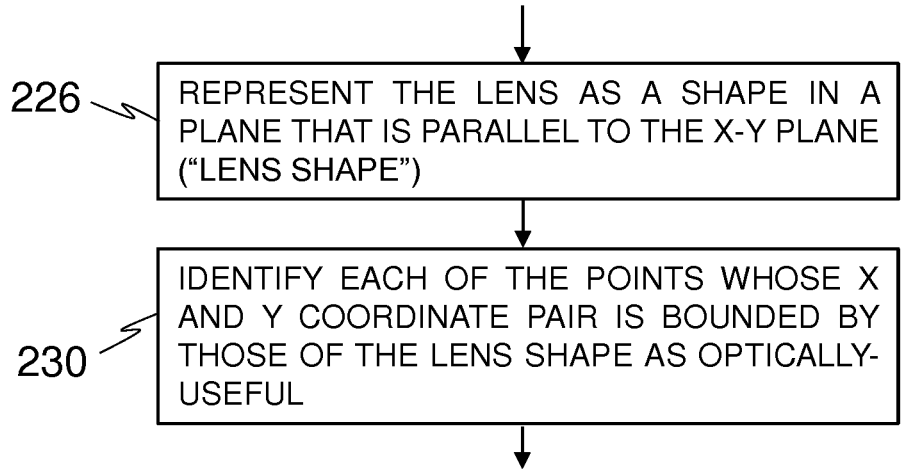
FIGS. 8 and 9 are flow charts showing methods for identifying optically-useful zone(s).
Figure 9:
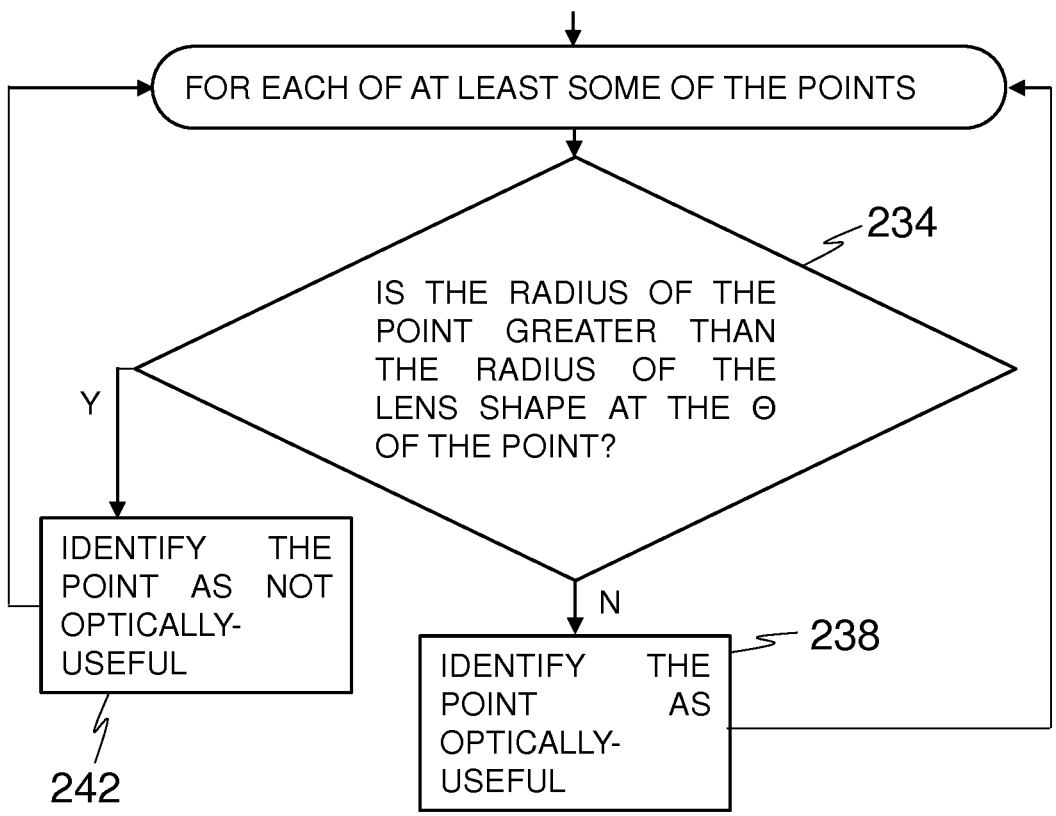
Figure 10A:
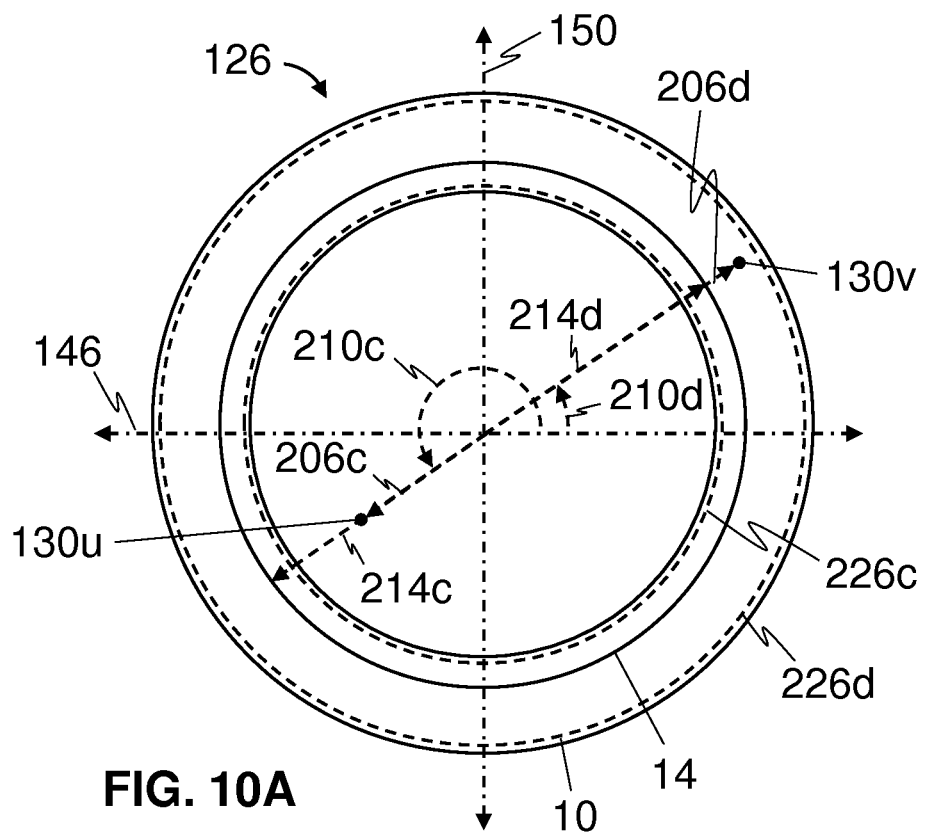
FIGS. 10A and 10B illustrate some of the methods of FIGS. 8 and 9.
Figure 10B:
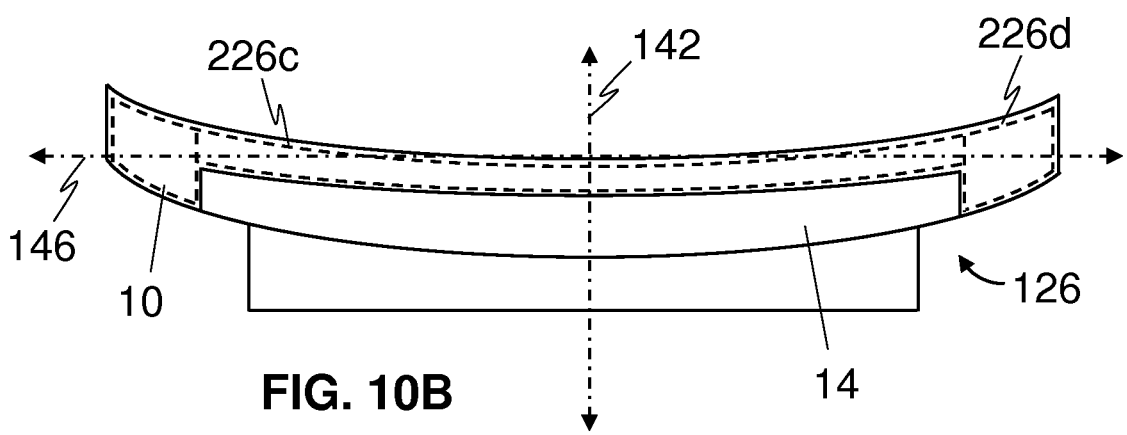
Figure 11:
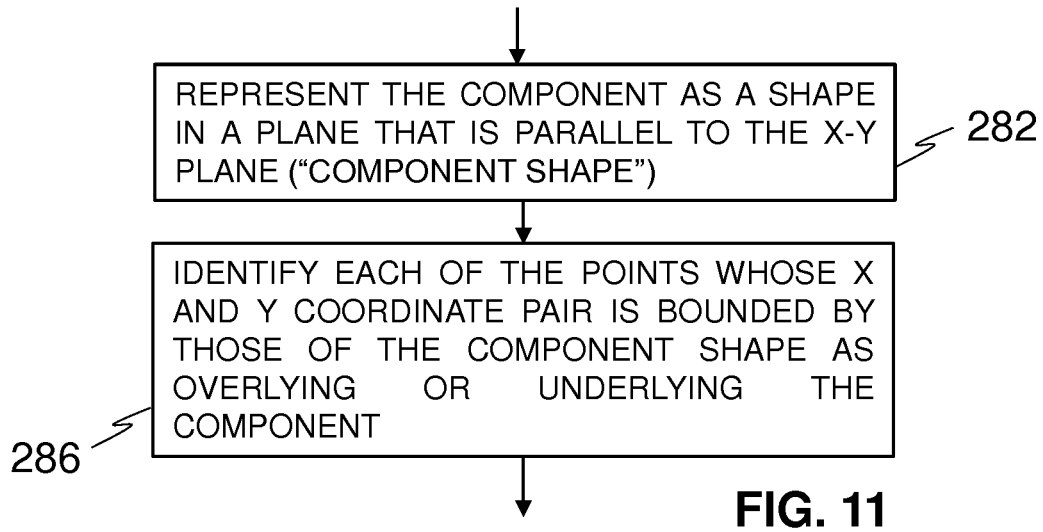
FIGS. 11 and 12 are flow charts showing methods for identifying zones) that overlie and/or underlie a component of the lens.
Figure 12:
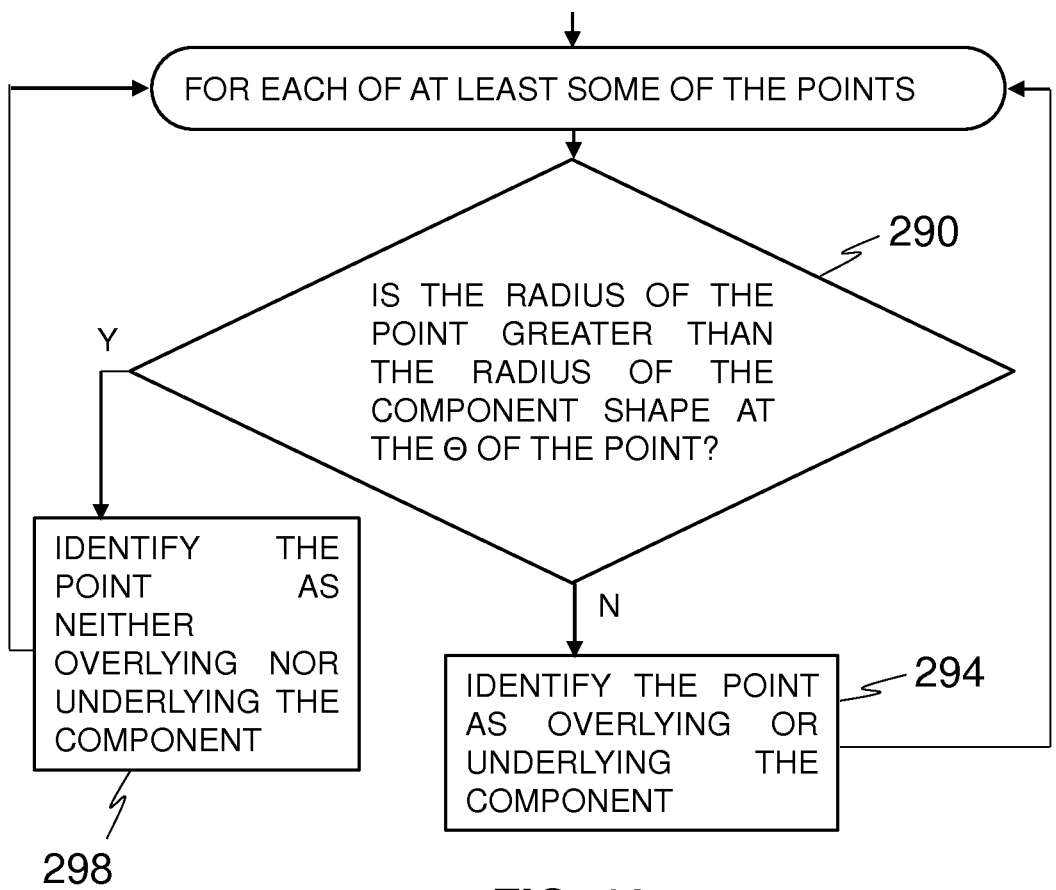

Referring additionally to FIGS. 5-7B, some methods include a step 182 of representing the machined portion of the lens blank as an array of points (e.g., including—amongst others—points 130s and 130t, FIG. 7A). Such points can be, for example, those that represent a volume of the machined portion (described above) such that the machined portion is represented three-dimensionally. In some methods, the machined portion can be represented two-dimensionally as a shape in a plane that is parallel to the X-Y plane ("machined portion shape"), such as, for example, the outline of an orthographic projection of the machined portion onto such a plane along the Z-axis, a perimeter of the machined portion taken in such a plane, and/or the like. In these methods, such points can lie on and within the machined portion shape. Each of the points can have at least an X-coordinate, measured along the X-axis and a Y-coordinate measured along the Y-axis. It will be understood that such X- and Y-coordinates are interchangeable with polar coordinates—radiuses and Θs—in which the intersection of the X- and Y-axes is the pole, and the X- or Y-axis is the polar axis. In some methods, such points can further include a Z-coordinate, measured along the Z-axis. In either the two- or three-dimensional representation, an average distance between nearest points can be, for example, less than or approximately equal to any one of, or between any two of: 3.0, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7. 0.6, 0.5, 0.4, 0.3, 0.2, or 0.1 millimeters (mm).

In some methods, at step 186, the blocking material can be represented as a shape in a plane that is parallel to the X-Y plane ("block shape"), The block shape can be, for example, the outline of an orthographic projection of the surface of the blocking material that contacts the lens blank onto such a plane along the Z-axis, a perimeter or a cross-section of the blocking material taken in such a plane, and/or the like.

At step 190, in some methods, each of the points representing the machined portion whose X and Y coordinate pair (regardless of its Z-coordinate, if it has one) is bounded by (lies within or on one of) those of the block shape can be identified as supported by the block. For example, some methods include, for each of at least some of the points, a step 194 of determining whether the radius of the point is greater than the radius of the block shape at the Θ of the point. If not, at step 198, the point can be identified as supported; if so, at step 202, the point can be identified as unsupported. To illustrate using FIG. 7A, radius 206a of point 130s is less than radius 214a of the block shape at Θ 210a of point 130s; thus, point 130s is supported. And, a radius 206b of point 130t is greater than radius 214b of the block shape at a Θ 210b of point 130t; thus, point 130t is unsupported.

Once identified, supported ones of the points can be grouped to define supported zone(s) (e.g., 226a). If the machined portion is represented two-dimensionally, this can be performed by grouping supported ones of the points to define supported area(s) and identifying portion(s) of the machined portion that underlie and/or overlie (depending on the location of the plane in which the machined portion shape is defined) the supported area(s) as the supported zone(s). A portion of the machined portion can underlie and/or overlie a supported area if, for example: (1) all or substantially all of that portion lies within a volume defined by: (a) a generatrix that is the supported area; and (b) a directrix that is the Z-axis; (2) a line that is parallel to the Z-axis and extends through the supported area also extends through that portion; and/or the like. Unsupported ones of the points can be similarly grouped to define unsupported zone(s) (e.g., 226b). Such grouping of the points can be performed using, for example, a clustering algorithm (described below).

Turning to step 166 (FIG. 4), optically-useful zone(s) can be identified, such as, for example, those that overlie and/or underlie the lens. A zone can overlie and/or underlie the lens if, for example: (1) all or substantially all of the zone lies within a volume defined by: (a) a generatrix that is a surface of the lens (e.g., the front face or the back face, either optionally including at least a portion of the edge); and (b) a directrix that is the Z-axis; (2) a line that is parallel to the Z-axis and extends through the lens also extends through the zone, and/or the like. Such optically-useful zone(s) can be identified in any suitable fashion—the following description is provided solely by way of illustration.

Referring additionally to FIGS. 8-10B, some methods include a step 226 of representing the lens as a shape in a plane that is parallel to the X-Y plane ("lens shape"), which can be, for example, the outline of an orthographic projection of the lens onto such a plane along the Z-axis, a perimeter of the lens taken in such a plane, and/or the like.

At step 230, each of the points representing the machined portion (e.g., from the two- or three-dimensional representation described above) whose X and Y coordinate pair is bounded by those of the lens shape can be identified as optically-useful. For example, in some methods, for each of at least some of the points, it can be determined whether the radius of the point is greater than the radius of the lens shape at the Θ of the point (step 234, FIG. 9). If it is not, the point can be identified as optically-useful at step 238, and, if it is, the point can be identified as not optically-useful at step 242. Using FIG. 10A to illustrate, radius 206c of point 130u is less than radius 214c of the lens shape at Θ 210c of point 130u; thus, point 130u is optically-useful. On the other hand, radius 206d of point 130v greater than radius 214d of the lens shape at Θ 210d of point 130v; thus, point 130v is not optically-useful. In methods in which a three-dimensional representation of the machined portion (e.g., as described above) is used, ones of the points may be identified as not optically-useful (even if underlying and/or overlying the lens) unless such points are within a threshold distance from the front face or the back face of the lens, measured in a direction that is parallel to the Z-axis.

Similarly to as described above for supported zone(s), optically-useful zone(s) (e.g., 226c) can be defined by grouping optically-useful ones of the points, and not optically-useful zone(s) (e.g., 226d)—sometimes referred to as waste zone(s) can be defined by grouping not optically-useful ones of the points. For example, if the machined portion is represented in two dimensions, optically-useful ones of the points can be grouped to define optically-useful area(s), and portion(s) of the machined portion that overlie and/or underlie the optically-useful area(s) can be identified as optically-useful zone(s).

In some instances, the lens can include a component (e.g., 270, FIGS. 13A and 13B) disposed therein. Such a component can be, for example, a polar film or wafer, a display, a waveguide, circuitry, a processor, a sensor, and/or the like. In such instances, one or more of the zones can be identified relative to the component.

For example, at step 170 (FIG. 4), zone(s) that overlie and/or underlie the component can be identified. Such a zone can be one that, for example, all or substantially all of which lies within a volume defined by: (1) a generatrix that is a surface of the component; and (2) a directrix that is the Z-axis. For further example, such a zone can be one that a line parallel to the Z-axis that extends through the component also extends through the zone. Zone(s) that overlie and/or underlie the component can be identified in any suitable fashion; the following description is provided solely by way of illustration.

Referring additionally to FIGS. 11-13B, in some methods, the component can be represented as a shape in a plane that is parallel to the X-Y plane ("component shape") (step 282). For example, the component shape can be the outline of an orthographic projection of the component onto such a plane, a perimeter or a cross-section of the component taken in such a plane, and/or the like.

Figure 13A:
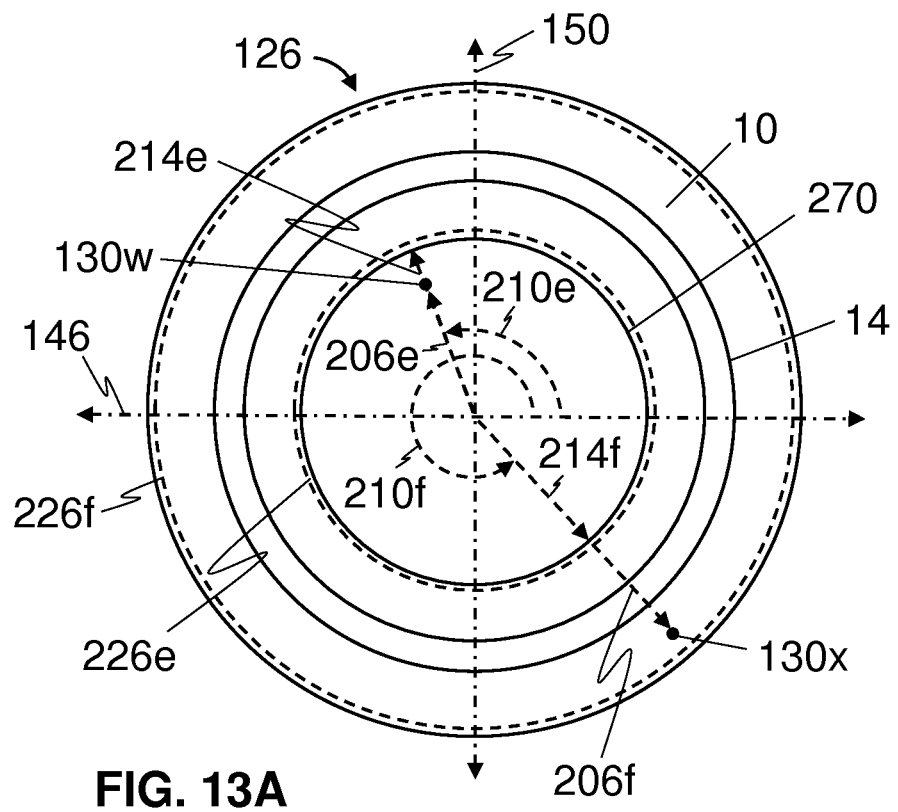
FIGS. 13A and 13B illustrate some of the methods of FIGS. 11 and 12.
Figure 13B:
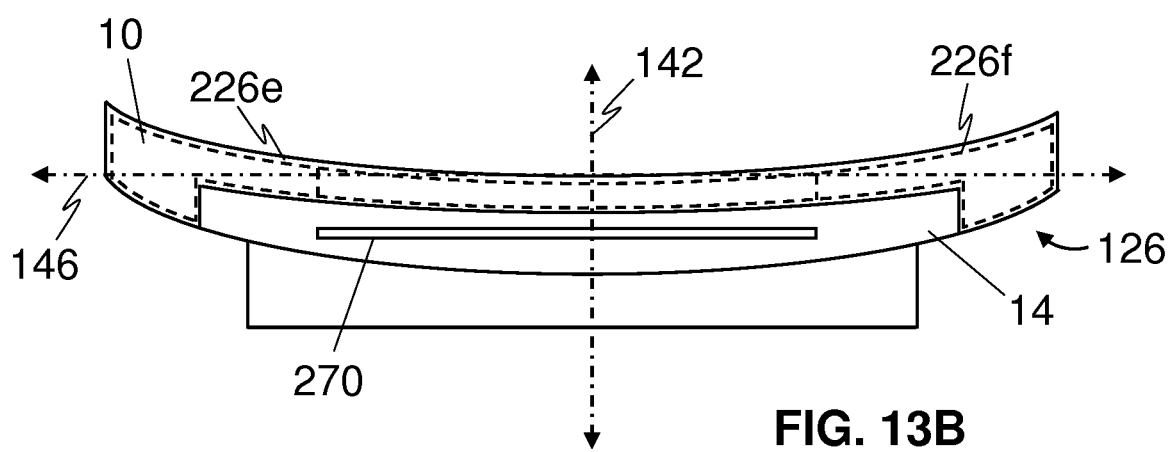

Next, each of the points representing the machined portion (e.g., from the two- or three-dimensional representation described above) whose X and Y coordinate pair is bounded by those of the component shape can be identified as overlying or underlying the component (step 286). For example, some methods include, for each of at least some of the points, a step 290 of determining whether the radius of the point is greater than the radius of the component shape at the Θ of the point—if not, the point can be identified as overlying or underlying the component (step 294), and, if so, the point can be identified as neither overlying nor underlying the component (step 298). These steps are illustrated in FIG. 13A: (1) radius 206e of point 130w is less than radius 214e of the component shape at Θ 210e of point 130w; thus, point 130w overlies or underlies the component; and (2) radius 206f of point 130x is greater than radius 214f of the component shape at Θ 210f of point 130x; thus, point 130x neither overlies or underlie the component. In methods in which a three-dimensional representation of the machined portion (e.g., as described above) is used, ones of the points may be identified as neither overlying nor underlying the component unless such points are within a threshold distance from the component, measured in a direction that is parallel to the Z-axis.

Similarly to as described above for supported zone(s), zone(s) that overlie and/or underlie the component (e.g., 226e) can be defined by grouping ones of the points that overlie or underlie the component, and zone(s) that neither overlie nor underlie the component (e.g., 226f) can be defined by grouping ones of the points that neither overlie nor underlie the component. For example, if the machined portion is represented in two dimensions, ones of the points that overlie or underlie the component can be grouped to define area(s) that overlie and/or underlie the component, and portion(s) of the machined portion that overlie and/or underlie such area(s) can be identified as zone(s) that overlie and/or underlie the component.

In some methods, at step 174, optically-sensitive zone(s) can be identified, which are those that underlie and/or overlie optically-sensitive portion(s) of the lens (FIG. 4). Such an optically-sensitive portion can include, for example, a distance vision portion (e.g., 46) or a near vision portion (e.g., 54) of the lens. To illustrate, the distance and near vision portions can each be: (1) a portion of the lens at which the power of the lens is, or is within a threshold value of, a distance power and a near power, respectively, of the lens; or (2) a predefined portion of the lens (e.g., specified in the lens prescription). To further illustrate, the distance and near vision portions can each be a portion of the lens that all or substantially alt of lies within a volume defined by: (1) a generatrix lying in a plane that is parallel to the X-Y plane, where the generatrix includes, for the distance vision portion, a distance reference point (e.g., 50) of the lens, and, for the near vision portion, a near reference point (e.g., 58) of the lens, and is bounded at a threshold distance from that point, measured along the plane that is parallel to the X-Y plane; and (2) a directrix that is the Z-axis. To yet further illustrate, the distance and near vision portions can each be a portion of the lens that all or substantially all of lies within a volume defined by: (1) a generatrix defined on a surface (e.g., the front face or the back face) of the lens, where the generatrix includes, for the distance vision portion, the distance reference point, and, for the near vision portion, the near reference point, and is hounded at a threshold distance from that point, measured along that surface; and (2) a directrix that is the Z-axis.

For further example, an optically-sensitive portion can be one that includes a prism reference point (e.g., 78) of the lens or one that includes a fitting point (e.g., 74) of the lens. Each of these lens portions can be predefined or can include a portion of the lens that all or substantially all of lies within a volume defined as described above for the distance and near vision portions, but using, for the portion of the lens that includes the prism reference point, the prism reference point, and, for the portion of the lens that includes the fitting point, the fitting point, instead of the distance reference point or the near reference point.

For yet further example, an optically-sensitive portion can include a progressive corridor (e.g., 62) of the lens. To illustrate, the progressive corridor can be: (1) a portion of the lens that is disposed between the distance and near vision portions and along which the power of the lens transitions between the distance power and the near power; or (2) a predefined portion of the lens. To further illustrate, the progressive corridor can be a portion of the lens that all or substantially all of lies within a volume defined by: (1) a generatrix lying in a plane that is parallel to the X-Y plane, where the generatrix includes a line that extends between the X and Y coordinate pair of the prism reference point (or the distance reference point) and the X and Y coordinate pair of the near reference point and is bounded at a threshold distance from that line, measured along the plane that is parallel to the X-Y plane; and (2) a directrix that is the Z-axis. To yet further illustrate, the progressive corridor can be a portion of the lens that all or substantially all of lies within a volume defined by: (1) a generatrix defined on a surface (e.g., the front face or the back face) of the lens, where the generatrix includes a line extending along that surface between the prism reference point (or the distance reference point) and the near reference point and is bounded at a threshold distance from that line, measured along that surface; and (2) a directrix that is the Z-axis. In some instances, the progressive corridor may not include the distance and/or near vision portions of the lens.

A zone can overlie and/or underlie an optically-sensitive portion of the lens (and thus be optically-sensitive) if, for example: (1) all or substantially all of the zone lies within the volume described above for identifying that optically-sensitive portion; or (2) a line that is parallel to the Z-axis and extends through that optically-sensitive portion also extends through the zone. An optically-sensitive portion of the lens—such as any one of those described above—may be an interior portion of the lens, and a zone overlying and/or underlying such an optically-sensitive portion can be bounded by an interior portion of the front face and/or the back face of the lens. Optically-sensitive zone(s) can be identified in any suitable fashion—the following description is provided solely by way of illustration.

Figure 14A:
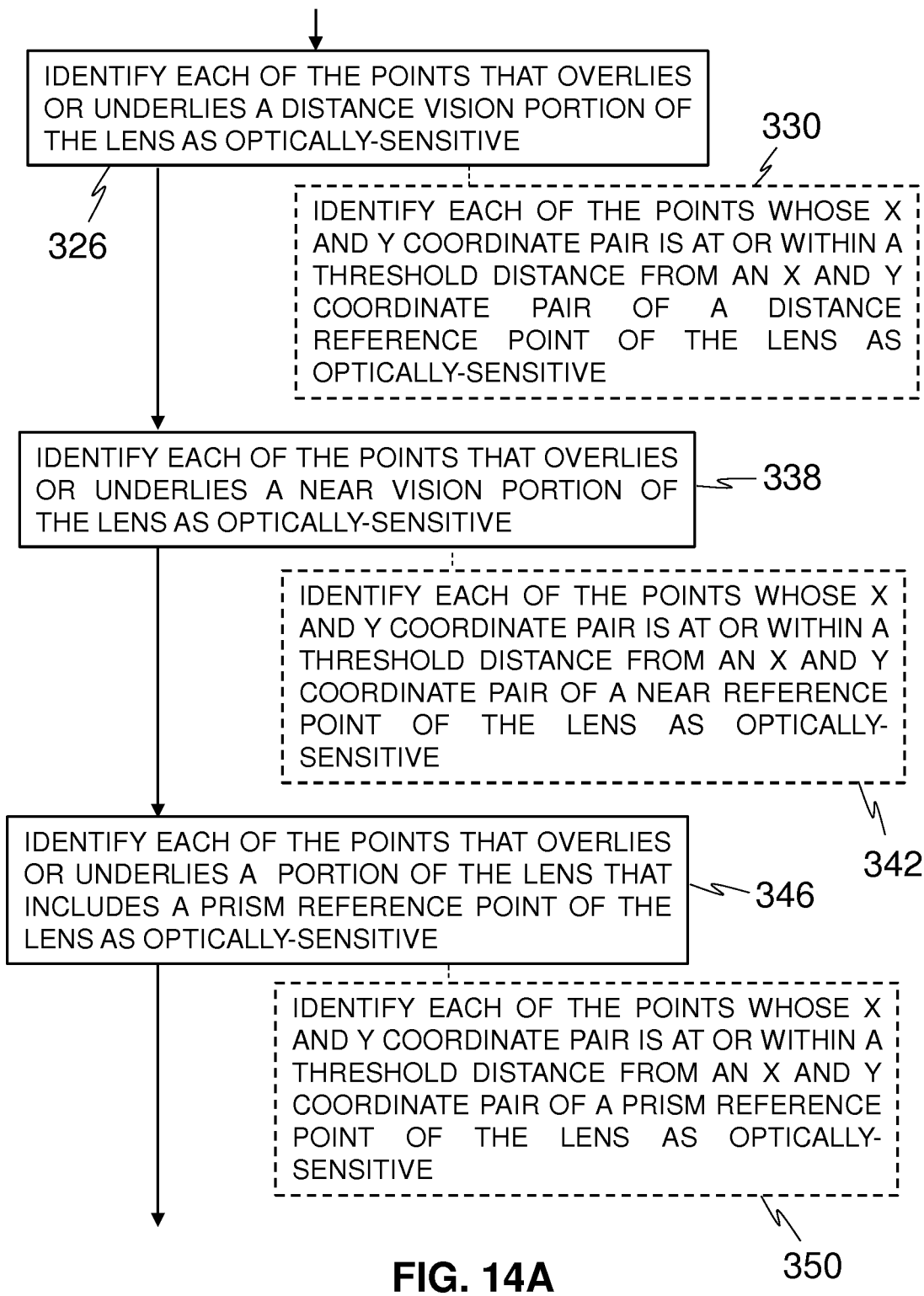
FIGS. 14A and 14B are flow charts showing methods for identifying optically-sensitive zone(s).
Figure 14B:
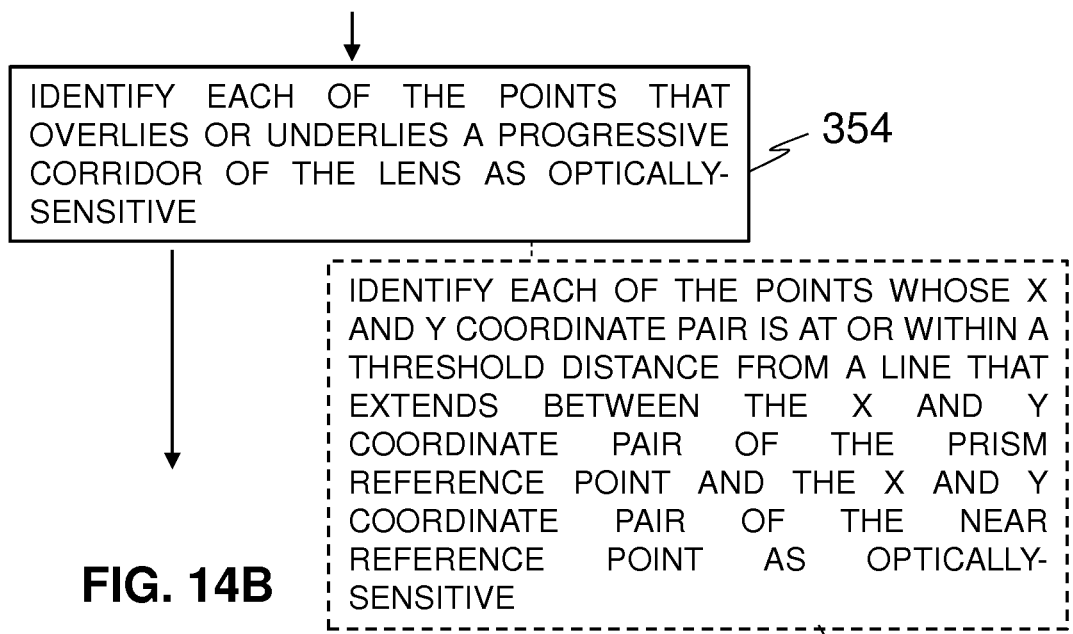
Figure 15:
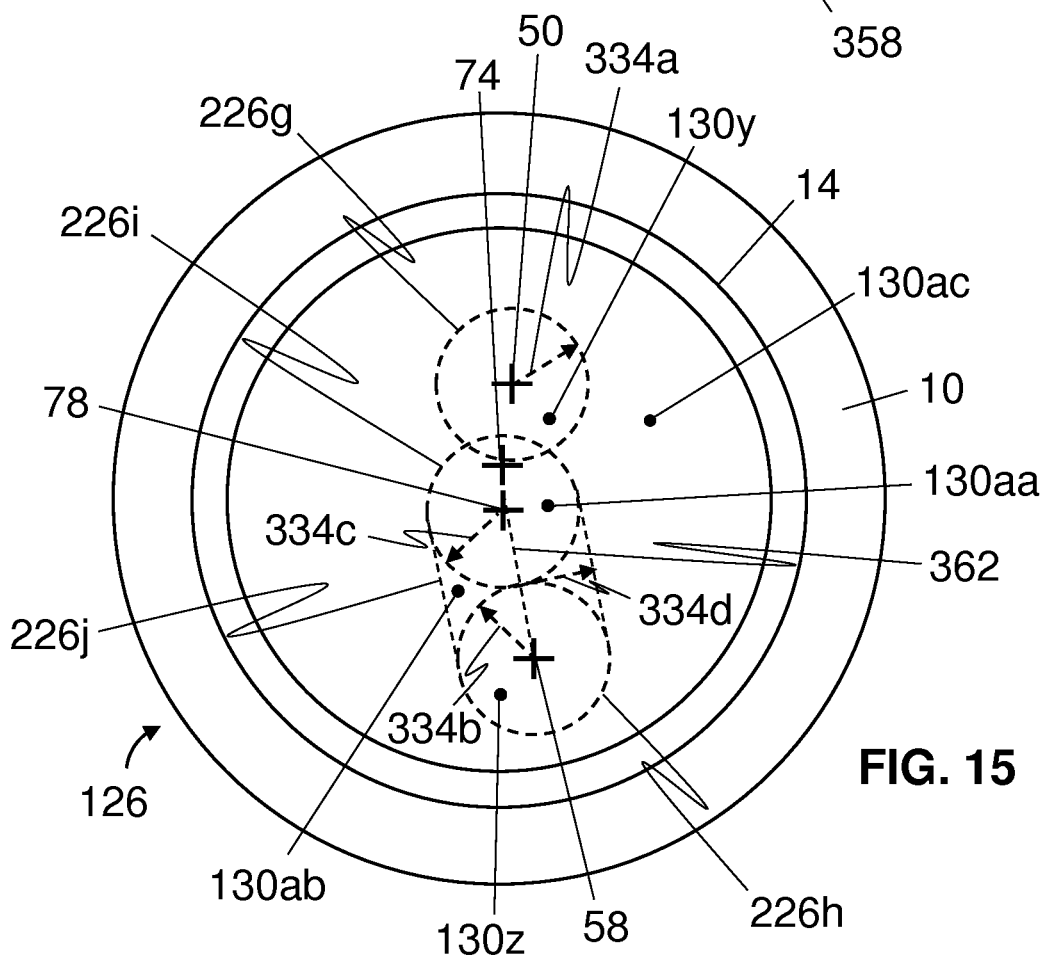
FIG. 15 illustrates some of the methods of FIGS. 14A and 14B.

Referring additionally to FIGS. 14A-15, in some methods, each of the points representing the machined portion (e.g., from the two- or three-dimensional representation described above) that overlies or underlies an optically-sensitive portion of the lens can be identified as optically-sensitive. Such optically-sensitive points can he, for example, those that overlie or underlie the distance vision portion of the lens (step 326), which are—in some methods—those whose X and Y coordinate pairs are at or within a threshold distance from the X and Y coordinate pair of the distance reference point (step 330). This is illustrated in FIG. 15; the X and Y coordinate pair of point 130$y$ is at or within a threshold distance 334$a$ from the X and Y coordinate pair of distance reference point 50; thus, point 130$y$ is optically-sensitive.

For further example, in some methods, each of the points that overlies or underlies the near vision portion of the lens can be identified as optically-sensitive at step 338. Such optically-sensitive points can be those whose X and Y coordinate pairs are at or within a threshold distance from the X and Y coordinate pair of the near reference point (step 342). To illustrate using FIG. 15, the X and Y coordinate pair of point 130$z$ is at or within a threshold distance 334$b$ from the X and Y coordinate pair of near reference point 58; therefore, point 130$z$ is optically-sensitive.

For yet further example, some methods include a step 346 of identifying each of the points that overlies or underlies the portion of the lens that includes the lens's prism reference point as optically-sensitive. These optically-sensitive points can he, for example, those whose X and Y coordinate pairs are at or within a threshold distance from the X and Y coordinate pair of the prism reference point (step 350). As FIG. 15 illustrates, point 130$aa$ is at or within a threshold distance 334$c$ from the X and Y coordinate pair of prism reference point 78; thus, point 130$aa$ is optically-sensitive.

For yet further example, in some methods, each of the points that overlies or underlies the progressive corridor of the lens can be identified as optically-sensitive (step 354). At step 358, such optically-sensitive points can be identified as, for example, those whose X and Y coordinate pairs are at or within a threshold distance from a line that extends between the X and Y coordinate pair of the prism reference point (or the distance reference point) and the X and Y coordinate pair of the near reference point. This is illustrated in FIG. 15—the X and Y coordinate pair of point 130$ab$ is at or within a threshold distance 334$d$ from a line 362 that extends between the X and Y coordinate pair of prism reference point 78 and the X and Y coordinate pair of near reference point 58; therefore, point 130$ab$ is optically-sensitive. In some methods, points (e.g., 130$ac$) that are not optically-sensitive can be identified as such.

In methods in which a three-dimensional representation of the machined portion (e.g., as described above) is used, ones of the points may be identified as not optically-sensitive unless such points are within a threshold distance from an optically-sensitive portion of the lens, measured in a direction that is parallel to the Z-axis.

Similarly to as described above for supported zone(s), optically-sensitive zone(s) (e.g., 226$g$, 226$h$, 226$i$, 226$j$, and the like) can be defined by grouping optically-sensitive ones of the points, and not optically-sensitive zone(s) can be defined by grouping not optically-sensitive ones of the points. For example, if the machined portion is represented in two dimensions, optically-sensitive ones of the points can be grouped to define optically-sensitive area(s), and portions of the machined portion that overlie and/or underlie such areas can be identified as optically-sensitive zone(s).

Not optically-sensitive zone(s) can be those that underlie and/or overlie not optically-sensitive portion(s of the lens, such as, for example, a lateral vision portion (e., 64) of the lens. A not optically-sensitive portion of the lens may be located at the lens's periphery, and a zone overlying and/or underlying such a not optically-sensitive portion can be bounded by a periphery of the front face and/or the back face of the lens.

In the present methods, zones other than the exemplary ones described above can be identified. For example, some methods include identifying low-thickness zone(s), each of which overlies and/or underlies a portion of the lens along which the lens's thickness is less than or equal to a threshold thickness. Such a thickness can, for example, be measured between the front face and the back face of the lens in a direction that is parallel to the Z-axis. Similarly, in some methods, high-thickness zone(s) can be identified as those that each overlie and/or underlie a portion of the lens along which the lens's thickness is greater than the threshold thickness. In some methods, a low-thickness zone can be one that is disposed within a portion of the lens blank at which a thickness of the lens blank, measured between the front face and the back face of the lens blank in a direction that is parallel to the Z-axis, is less than or equal to a threshold thickness, and a high-thickness zone can be one that is disposed within a portion of the lens blank at which such a thickness is greater than the threshold thickness.

To identify such zones, for each of the points representing the machined portion, if a thickness of the lens and/or the lens blank at the X and Y coordinate pair of the point is less than or equal to a threshold thickness, the point can be identified as a low-thickness point, and, if the thickness of the lens and/or the lens blank at the X and Y coordinate pair of the point is greater than the threshold thickness, the point can be identified as a high-thickness point. Once identified, low-thickness points can be grouped to define low-thickness zone(s), and high-thickness points can be grouped to define high-thickness zone(s), similarly to as described above.

In some methods, at least one of the zones can be defined within an overlap between at least two other zones. Such an overlap can be, for example, one between any two or more of: a supported zone, an unsupported zone, an optically-useful zone, a not optically-useful zone, a zone that overlies and/or underlies the component, a zone that neither overlies nor underlies the component, an optically-sensitive zone, a not optically-sensitive zone, a high-thickness zone, and a low-thickness zone.

Figure 16:
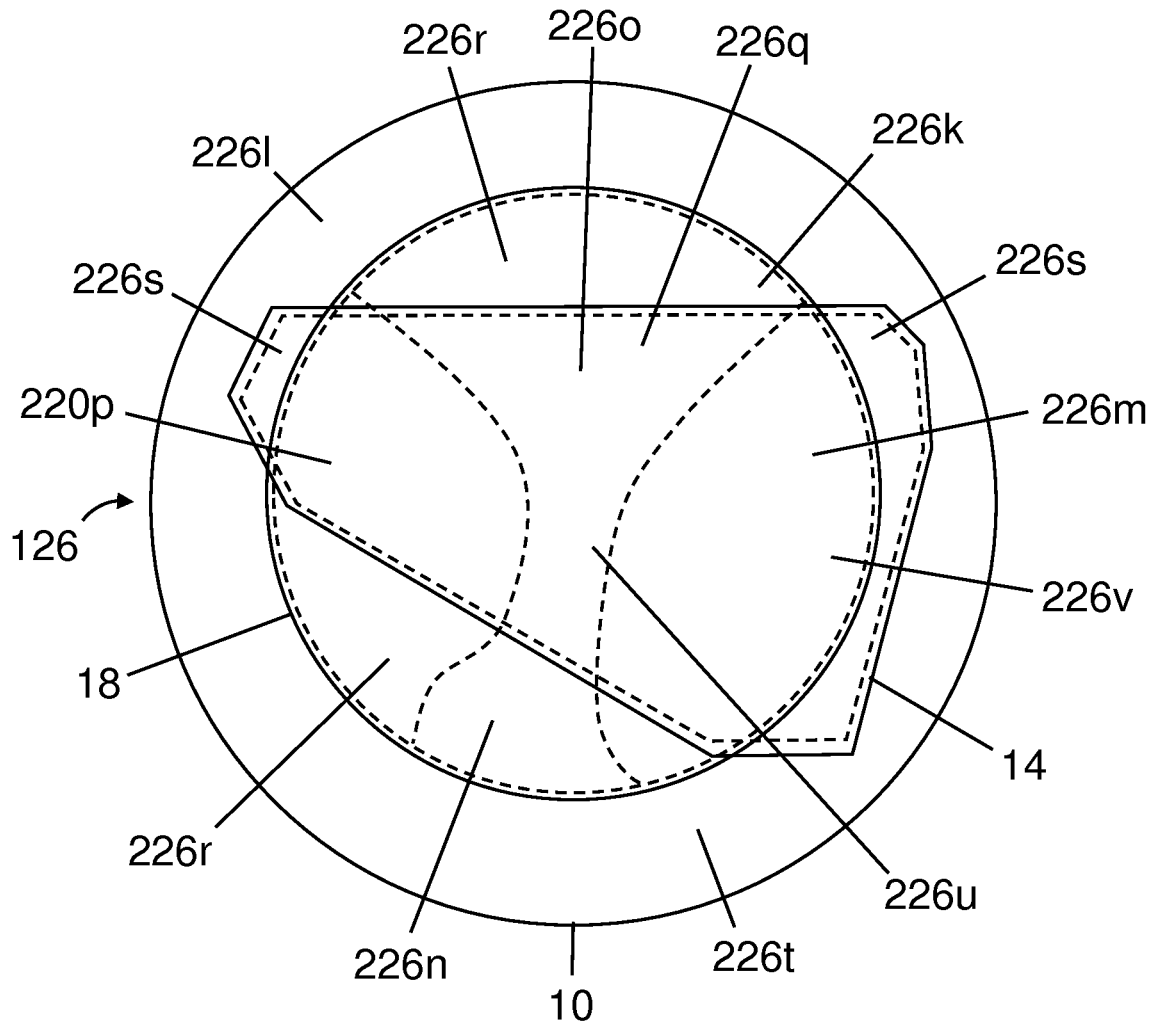
FIG. 16 illustrates zones identified within a spatial representation of a lens blank.

To illustrate, FIG. 16 depicts exemplary zones identified within a spatial representation 126 of a lens blank 10, which include a supported zone 226k, an unsupported zone 226l, an optically-useful zone 226m, a not optically-useful zone 226n, an optically-sensitive zone 226o, a not optically-sensitive zone 226p, as well as several zones that are each defined within an overlap between at least two others of the zones. For example, the zones can include a supported, optically-useful zone 226q, defined within an overlap between supported zone 226k and optically-useful zone 226m, and supported, not optically-useful zones 226r, each defined within an overlap between the supported zone and not optically-useful zone 226n. Similarly, the zones can include unsupported, optically-useful zones 226s, each defined within an overlap between unsupported zone 226l and optically-useful zone 226m, mid an unsupported, not-optically useful zone 226t defined within an overlap between the unsupported zone and not optically-useful zone 226n. For further example, the zones can include a supported, optically-useful, and optically-sensitive zone 226u, defined within an overlap between supported, optically-useful zone 226q and optically-sensitive zone 226o, and supported, optically-useful, and not optically-sensitive zones 226v, each defined within an overlap between the supported, optically-useful zone and not optically-sensitive zone 226p.

Zone(s) defined within an overlap between at least two other zones can be identified in any suitable fashion—the following description is provided solely by way of illustration. As described above, each of the points that represent the machined portion (e.g., from the two- or three-dimensional representation described above) can have characteristic(s), including, for example, supported, unsupported, optically-useful, not optically-useful, overlies or underlies the component, neither overlies nor underlies the component, optically-sensitive, not optically-sensitive, high-thickness, low-thickness, and/or the like. And, as also described above, ones of the points having a single characteristic in common can be grouped to define zone(s) having that characteristic. In the same way, ones of the points having two or more characteristics in common can be grouped to define zone(s) having those characteristics; to illustrate, ones of the points that are each unsupported and optically-sensitive can be grouped to define unsupported, optically-sensitive zone(s). It will be understood that to define a zone within an overlap between at least two other zones does not first require the other zones to be defined by grouping ones of the points; instead, the zone can be defined directly by grouping ones of the points based on their characteristics—such a zone is still considered to be defined in an overlap between the other zones.

In some methods, grouping of the points to define zones can be performed using a clustering algorithm. To illustrate, in some methods, the clustering algorithm can be a single link clustering algorithm. In such an algorithm, the clusters can be initialized such that each of the points is its own cluster. Next, in an iterative fashion, ones of the clusters that: (1) have the same characteristic(s); and (2) are disposed at a distance from one another, measured between the closest ones of their point(s), that is less than or equal to a threshold distance can be combined to define a single cluster. In some methods, the characteristic(s) in criterion (1) can be a subset of available characteristics; for example, the subset can consist of supported, unsupported, optically-useful, and not optically-useful. In such a method, clusters that meet criterion (2) and are each unsupported and optically-useful can be combined, even if one(s) of those clusters are optically-sensitive and other(s) of those clusters are not optically-sensitive. The algorithm may finish when no retraining ones of the clusters meet the criteria for combination or when a maximum number of iterations has been reached. Such a clustering algorithm is provided solely by way of illustration; in other methods, the points can be grouped using other clustering algorithms (or non-clustering algorithms).

FIG. 17 depicts some of the present methods for selecting, for each of at least some the zones, one or more parameters for producing the lens (step 114, FIG. 2), which can include: an implement for removing material from the lens blank (step 374), a rotational speed of the implement relative to the lens blank (step 378), a translational speed of the implement relative to the lens blank (step 382), and/or a depth of cut of the implement into the lens blank (step 394). While generator 398 of FIG. 18 is referenced below to illustrate these parameters, generator 398 is not limiting on these parameters, which can be specified for any suitable machining equipment (e.g., another generator—whether traditional, DS, 5-axis, or the like, an edger, a polisher, an engraver, and/or the like).

Beginning with step 374, for at least one of the zones, an implement for removing material from the lens blank can be selected. To illustrate, the implement can be a cutting implement, such as cutting bit 402 of generator 398, a generating wheel of a generator, an edging wheel of an edger, and/or the like. To further illustrate, the implement can be a polishing implement, such as a polishing pad of a polisher.

Such implements can be characterized in terms of their aggressiveness. For example, other parameters being equal (e.g., rotational and translational speed of the implement relative to the lens blank, pressure between the implement and the lens blank, and the like), a more aggressive implement may remove more material from the lens blank than a less aggressive implement. For further example, a more aggressive implement can have a rougher surface that contacts the lens blank during machining, have a larger surface area that contacts the lens blank during machining (e.g., a cutting bit having a larger diameter as opposed to one having a smaller diameter, a cutting bit having a larger radius of curvature as opposed to one having a smaller radius of curvature, a polishing pad having a larger such surface area than one having a smaller such surface area), be less round (e.g., a cutting bit having a square end as opposed to one having a ball end), and/or the like than a less aggressive implement. For yet further example, a more aggressive implement can be one that is known in the art as "coarse," and a less aggressive implement can be one that is known in the art as "fine."

To illustrate, a less aggressive implement can be selected for zone(s) that are more important in terms of aesthetic and/or optical quality, such as, for example, zone(s) that are optically-useful, optically-sensitive, and/or the like, than for zone(s) that are less important in terms of aesthetic and/or optical quality, such as, for example, zone(s) that are not optically-useful, not optically-sensitive, and/or the like. Further, a less aggressive implement can be selected for zone(s) that are more susceptible to undesirable damage during machining (e.g., vibration marks), such as, for example, zone(s) that are unsupported, low-thickness, and/or the like, than for zone(s) that are less susceptible to undesirable damage during machining, such as, for example, zone(s) that are supported, high-thickness, and/or the like. In this way, when removing material from the lens blank, a less aggressive implement can be used in certain zone(s) to reduce the risk of defects in or undesirable damage to the lens, while a more aggressive implement can be used in certain zone(s) to decrease machining time for producing the lens.

To further illustrate, with other(s) of their characteristics being equal, a more aggressive implement can be selected: (1) for a zone that is supported than for a zone that is unsupported; (2) for a zone that is not optically-useful than for a zone that is optically-useful; (3) for a zone that neither overlies nor underlies the component than for a zone that overlies and/or underlies the component; (4) for a zone that is not optically-sensitive than for a zone that is optically-sensitive; and/or (5) for a zone that is high-thickness than for a zone that is low-thickness.

Turning to steps 378 and 382 (FIG. 17), for at least one of the zones, a rotational speed of the implement relative to the lens blank and/or a translational speed of the implement relative to the lens blank can be selected. Using generator 398 to illustrate, lens blank 10 can be translated (e.g., along axes 386*a*, 386*b*, and/or 386*c*) and/or rotated (e.g., in direction 390*a*) relative to portions of the generator, and/or cutting bit 402 can be translated (e.g., along axes 386*d*, 386*e*, and/or 386*f*) and/or rotated (e.g., in direction 390*b*) relative to portions of the generator. And, via such movement of lens blank 10 and/or cutting bit 402, the cutting bit can be translated and rotated relative to the lens blank. In general, lower rotational and/or translational speeds can be selected for zone(s) described above as suitable for machining using less aggressive implements, and higher rotational and/or translational speeds can be selected for zone(s) described above as suitable for machining using more aggressive implements. Further, such selection can provide benefits similar to those described above—reduced risk of defects in or undesirable damage to the lens and decreased machining time to produce the lens.

Provided by way of illustration, a higher rotational and/or translational speed can be greater than or approximately equal to any one of, or between any two of: 110, 115, 120, 125, 130, 135, 140, 145, 150, 155, 160, 165, 170, 175, 180, 185, 190, 195, or 200% of (e.g., at least 110% of and/or approximately 175% of) a lower rotational and/or translational speed. In some methods, a higher rotational and/or translational speed and/or a lower rotational and/or translational speed can be a percentage of a baseline rotational and/or translational speed, which can be a rotational and/or translational speed that would otherwise be used to machine the lens (e.g., specified in a configuration file, a macro for machining equipment, and/or the like). For example: (1) a higher rotational and/or translational speed can be greater than or approximately equal to any one of, or between any two of 110, 115, 120, 125, 130, 135, 140, 145, 150, 155, 160, 165, 170, 175, 180, 185, 190, or 200% of (e.g., at least 110% of and/or approximately 140% of) the baseline rotational and/or translational speed; and/or (2) a lower rotational and/or translational speed can be less than or approximately equal to any one of, or between any two of: 90, 85, 80, 75, 70, 65, 60, 55, 50, 45, 40, 35, 30, 25, or 20% of (e.g., 90% or less of and/or approximately 80% of) the baseline rotational and/or translational speed. A higher rotational and/or translational speed selected for one zone cart, but need not, be the same as a higher rotational and/or translational speed selected for another zone. Similarly, a lower rotational and/or translational speed selected for one zone can, but need not, be the same as a lower rotational and/or translational speed selected for another zone.

In some methods, a rotational and/or translational speed can be selected for at least one of the zones by selecting a feed rate and/or spiral distance for the zone. In such methods, higher feed rates and/or spiral distances can be selected for zone(s) described above as suitable for machining using higher rotational and/or translational speeds, and lower feed rates and/or spiral distances can be selected for zone(s) described above as suitable for machining using lower rotational and/or translational speeds. Further, higher feed rates and/or spiral distances and lower feed rates and/or spiral distances can have the values specified above for higher rotational and/or translational speeds and lower rotational and/or translational speeds, respectively (hut relative to each other and to a baseline feed rate and/or spiral distance, where appropriate).

Figure 21:
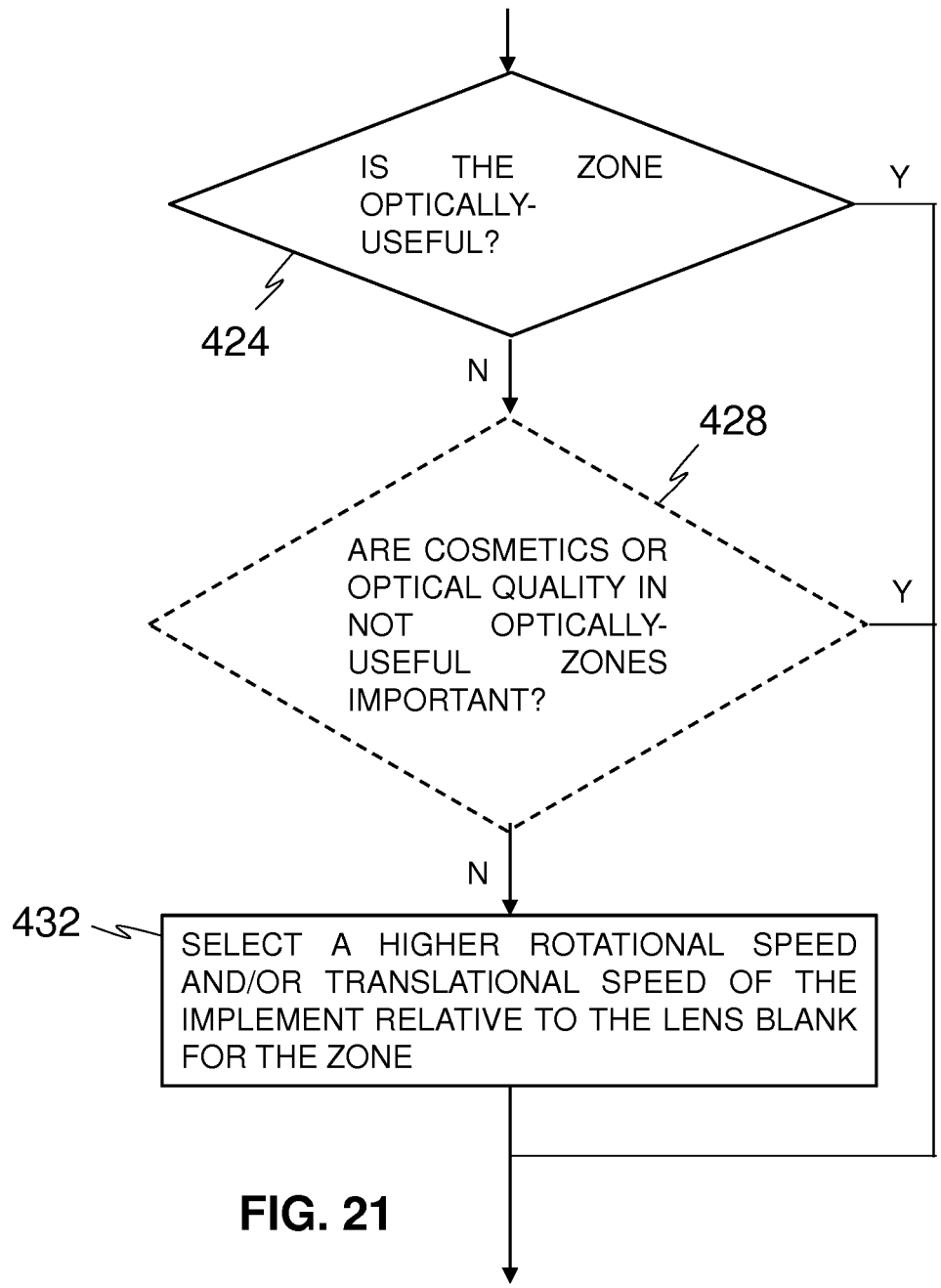

FIGS. 19-21, which are discussed in turn below, depict illustrative methods for selecting, for at least one of the zones, a rotational and/or translational speed of the implement relative to the lens blank. Beginning with the method of FIG. 19, for at least one of the zones, it can be determined whether the zone overlies and/or underlies the component at step 402. If it does, at step 406, a lower rotational and/or translational speed can be selected for that zone.

In FIG. 20's method, for at least one of the zones, it can be determined at step 410 whether the zone is optically-sensitive. If the zone is optically-sensitive, a lower rotational and/or translational speed can be selected for the zone at step 420. In some instances, even if the zone is optically-sensitive, such a lower rotational and/or translational speed may not be selected unless the zone is also unsupported (step 414).

As shown in FIG. 21, for at least one of the zones, if the zone is not optically-useful (step 424), a higher rotational and/or translational speed can be selected for the zone (step 432). As also shown in FIG. 21; however, if either cosmetics or optical quality in not optically-useful zones is important (discussed below), such a higher rotational and/or translational speed may not be selected for the zone—or a lower rotational and/or translational speed than that that would have otherwise been selected can be selected—in order to promote such cosmetics and/or optical quality (step 428). Methods similar to those in FIGS. 19-21 can be used to select other parameter(s); for example, a less aggressive implement, a shallower depth of cut of the implement into the lens blank (described below), and/or the like can be selected in addition to or in lieu of selecting a lower rotational and/or translational speed, and a more aggressive implement, a deeper depth of cut, and/or the like can be selected in addition to or in lieu of selecting a higher rotational and/or translational speed.

The importance of cosmetics and the importance of optical quality are examples of manufacturing preferences, which can be specified for one or more of the zones and used to select parameter(s) for those zone(s). For example, if cosmetics and/or optical quality are important for a zone, each of which can specified as true or false, parameter(s) that would have otherwise been selected for that zone based on its characteristic(s) may not be selected, typically in favor of selecting less aggressive parameter(s) (e.g., a less aggressive implement, a lower rotational and/or translational speed, a shallower depth of cut, and/or the like). Such manufacturing preferences can be specified in a configuration file. At least by accounting for such manufacturing preferences, the present methods can provide increased flexibility when producing a lens.

Moving to step 394 (FIG. 17), for at least one of the zones, a depth of cut of the implement into the lens blank can be selected. To illustrate, for generator 398, such a depth of cut can be the depth of cut of cutting bit 402 into the lens blank. Generally, shallower depths of cut can be selected for zone(s) described above as suitable for machining using less aggressive implements, and deeper depths of cut can be selected for zone(s) described above as suitable for machining using more aggressive implements. Similarly to as described above, such selection can provide a reduced risk of defects in or undesirable damage to the lens and decreased machining time to produce the lens.

To illustrate, a deeper depth of cut can be greater than or approximately equal to any one of, or between any two of: 110, 115, 120, 125, 130, 135, 140, 145, 150, 155, 160, 165, 170, 175, 180, 185, 190, 195, or 200% of (e.g., at least 110% of) a shallower depth of cut. In some methods, a deeper depth of cut and/or a shallower depth of cut can be a percentage of a baseline depth of cut; for example: (1) a deeper depth of cut can be greater than or approximately equal to any one of, or between any two of: (1) 110, 115, 120, 125, 130, 135, 140, 145, 150, 155, 160, 165, 170, 175, 180, 185, 190, 195, or 200% of (e.g., at least 110% of) the baseline depth of cut; and/or (2) a shallower depth of cut can be less than or approximately equal to any one of, or between any two of: 90, 85, 80, 75, 70, 65, 60, 55, 50, 45, 40, 35, 30, 25, or 20% (e.g., 90% or less of) the baseline depth of cut. A deeper depth of cut selected for one zone can, but need not, be the same as a deeper depth of cut selected for another zone. Similarly, a shallower depth of cut selected for one zone can, but need not, be the same as a shallower depth of cut selected for another zone.

The above parameters are solely illustrative; in the present methods, any suitable parameters can be selected for the zones. For example, other parameters that can be selected include a duration and/or power at which to operate an engraver and/or a pressure to be applied by and/or a cycle time for a polisher, each of which can be lower for zone(s) described above as suitable for machining using less aggressive implements, and higher for zone(s) described above as suitable for machining using more aggressive implements.

Figures 22, 23:
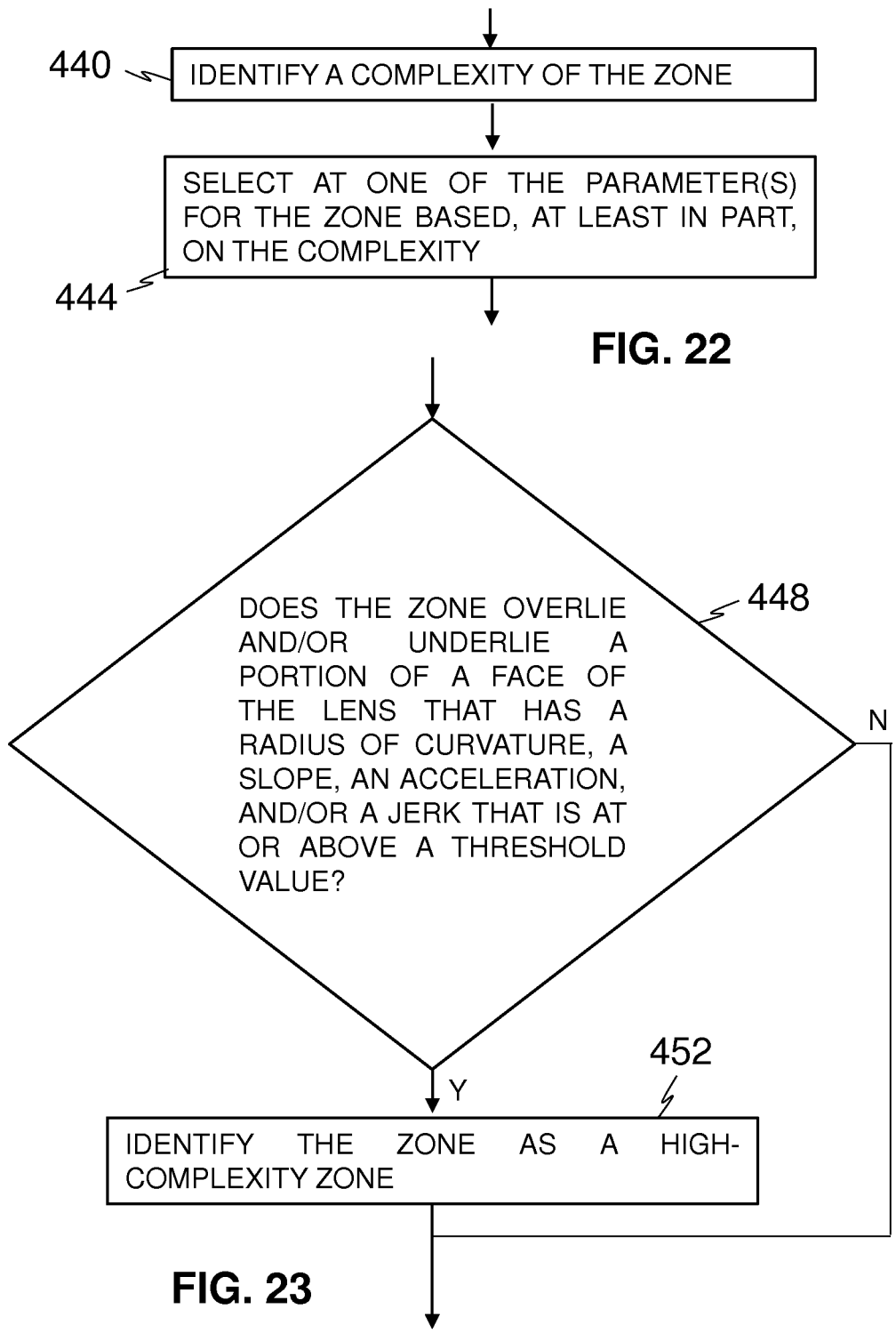
FIGS. 22 and 23 are flow charts showing methods for determining the complexity of at least one of the zones and selecting at least one of the parameter(s) for that zone based, at least in part, on the complexity.

Referring now to FIG. 22, some methods include, for at least one of the zones, identifying a complexity of the zone (step 440) and selecting at least one of the parameter(s) for the zone based, at least in part, on the complexity (step 444). The complexity of a zone can be identified based on one or more geometrical characteristics of a portion of the lens that the zone overlies and/or underlies, including, for example, a radius of curvature, a slope, an acceleration, a jerk, a curve-type (e.g., spherical or cylindrical), and/or the like of the back face of the lens (in the depicted configuration, if the zone overlies the lens) and/or the front face of the lens the depicted configuration, if the zone underlies the lens) at that portion. For a face of the lens, such geometrical characteristic(s) can be determined in any suitable fashion, including, for example, using (e.g., taking derivative(s) of) equation(s) that define or approximate that face, comparing the relative positions of adjacent ones of the points from the spatial representation that lie on that face, and/or the like. In some instances, such geometrical characteristic(s) for a face of the lens can be specified in the spatial representation.

Using FIG. 23 to illustrate, in some methods, if a zone overlies a portion of a lens face and/or underlies a portion of a lens face (e.g., in each instance, such that the zone is bounded by that portion) having a radius of curvature, a slope, an acceleration, and/or a jerk that is at or above a threshold value (step 448), the zone can be identified as a high-complexity zone (step 452). Such a radius of curvature, slope, acceleration, and/or jerk can be in any direction along the face. Similarly, if the zone neither overlies such a portion of a lens face nor underlies such a portion of a lens face, the zone can be identified as a low-complexity zone.

The binary nature of FIG. 23's method with respect to complexity is merely illustrative; in other methods, zones can each be identified as having one of three or more levels of complexity. For example, if a radius of curvature, a slope, an acceleration, and/or a jerk of a portion of a lens face is above a first threshold value, a zone underlying or overlying that portion can be identified as having a first level of complexity, and, if the radius of curvature, slope, acceleration, and/or jerk is above a second threshold value that is higher than the first threshold value, the zone can be identified as having a second level of complexity.

Parameter(s) selected for a zone can depend, at least in part, on the zone's complexity. For example, if the zone is high-complexity (or has at least a certain level of complexity), parameter(s) that would have otherwise been selected for that zone based on its other characteristic(s) (e.g., supported, unsupported, optically-useful, not optically-useful, overlies or underlies the component, neither overlies nor underlies the component, optically-sensitive, not optically-sensitive, high-thickness, low-thickness, and/or the like) may not be selected, typically in favor of selecting less aggressive parameter(s), such as, for example, a less aggressive implement, a lower rotational and/or translational speed, a shallower depth of cut, and/or the like. Such selection can, for example, reduce the risk of defects in and/or undesirable damage to the lens.

Figure 24A:
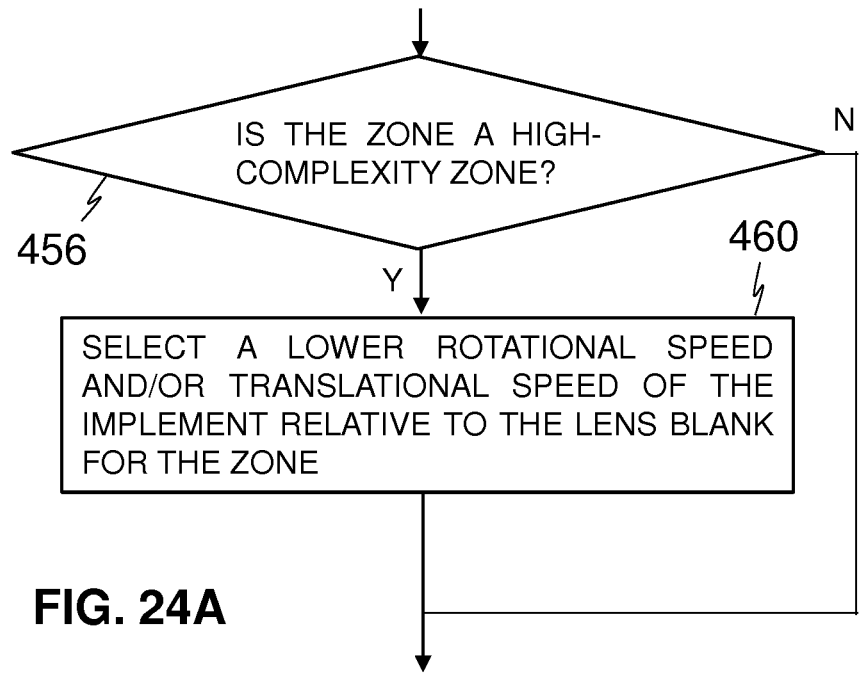
FIGS. 24A and 24B are flow charts showing methods for selecting, for at least one of the zones, at least one of the parameter(s) for producing the lens based on the complexity of the zone.

To illustrate, with other(s) of their characteristics being equal, a less aggressive implement, a lower rotational and/or translational speed (e.g., at least 10% lower), a shallower depth of cut (e.g., at least 10% shallower), and/or the like can be selected for a zone that is high-complexity than for one that is not (or for a zone that has a higher level of complexity than for a zone that has a lower level of complexity). To further illustrate with reference to FIG. 24A, in some methods, if a zone is high-complexity (step 456), a lower rotational and/or translational speed of the implement relative to the lens blank can be selected for that zone (and, in similar methods, a less aggressive implement, a shallower depth of cut, and/or the like can be selected in addition to or in lieu of such a lower rotational and/or translational speed).

Figure 24B:
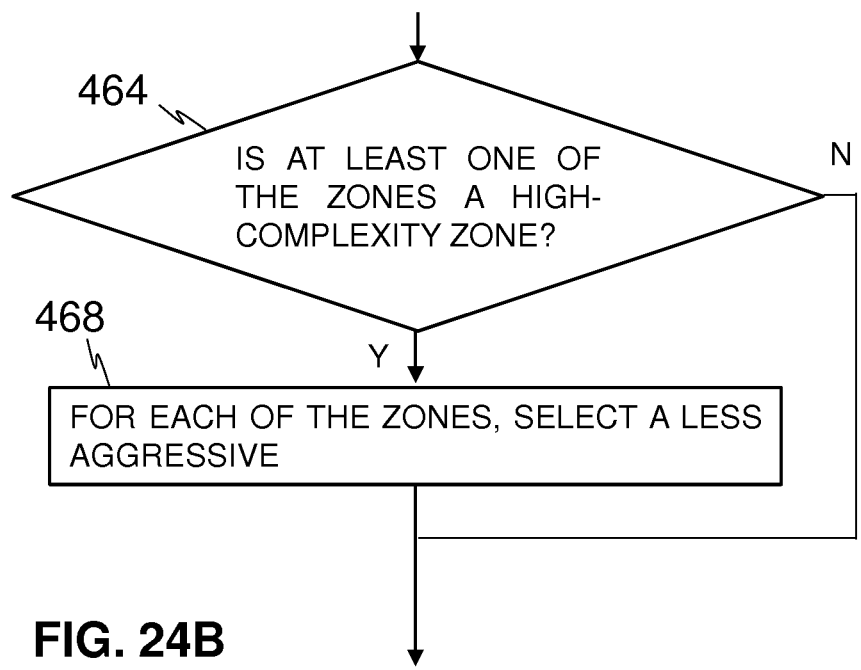

In some methods, one zone's characteristic(s) can be used to select parameter(s) for other(s) of the zones. For example, as shown in FIG. 24B, if a zone is high-complexity (step 464), a less aggressive implement, such as, for example, a smaller and/or finer polishing pad, can be selected for that zone as well as for each other of the zones (step 468).

In some methods, rather than identifying complexity level(s) of pre-identified zone(s) as described above, high-complexity zone(s) (or zone(s) having other level(s) of complexity) can be identified during step 110 (FIG. 2). Such a high-complexity zone can be, for example, one that overlies a high-complexity portion of a lens face and/or underlies a high-complexity portion of a lens face (e.g., in each instance, such that the zone is bounded by that portion). In turn, a high-complexity portion of a lens face can be a portion of the face having at least one geometrical characteristic, such as, for example, a radius of curvature, a slope, an acceleration, a jerk, and/or the like, that is at or above a threshold value. More particularly, the high-complexity portion of the lens face can include, for each of its points at which at least one of the geometrical characteristic(s) meets or exceeds a threshold value, that point as well as an area of the face bounded at a threshold distance from that point, measured along the X-Y plane and/or along the face. A zone can overlie or underlie a high-complexity portion of a lens face, if, for example: (1) all or substantially all of the zone lies within a volume defined by a generatrix that is that portion and a directrix that is the Z-axis; or (2) a line that is parallel to the Z-axis and extends through that portion also extends through the zone.

Such high-complexity zone(s) can be identified in any suitable fashion; the following description is provided solely by way of illustration. In some methods, each of the points representing the machined portion (e.g., from the two- or three-dimensional representation described above) that overlies or underlies a high-complexity portion of a lens face can be identified as high-complexity. Such high-complexity points can be, for example, those whose X and Y coordinate pairs are bounded by those of the high-complexity portion of the lens face (e.g., by those of an area associated with that portion, as described above). In some methods, points that are not high-complexity can be identified as such. Further, in methods in which a three-dimensional representation of the machined portion (e.g., as described above) is used, ones of the points may be identified as low-complexity unless such points are within a threshold distance of a high-complexity portion of a lens face, measured in a direction that is parallel to the Z-axis. Similarly to as described above for supported zone(s), high-complexity zone(s) can be defined by grouping high-complexity ones of the points, and low-complexity zone(s) can he defined by grouping low-complexity ones of the points.

Whether identified among pre-identified zone(s) or during step 110, zones having the same level of complexity can be treated the same with respect to selecting parameter(s) for producing the lens.

At least by selecting parameter(s) for producing the lens according to characteristic(s) of the zone(s), the present methods can be used to realize several advantages (in addition to those described above). For example, the present methods can be used to produce a lens having tighter tolerances (e.g., ±0.125 diopter) without unduly increasing machining time needed to produce the lens. To illustrate, in zone(s) where more precision is required, such as, for example, optically-sensitive zone(s), high-complexity zone(s), and/or the like, less aggressive parameter(s) can be used to machine the lens, and, in zone(s) where less precision is required, such as, for example, not-optically sensitive zone(s), low-complexity zone(s), and/or the like, more aggressive parameter(s) can be used to machine the lens. Thus, increased machining time needed to produce the lens in zone(s) requiring higher precision may be offset by decreased machining time needed to produce the lens in zone(s) requiring lower precision.

For further example, the present methods can facilitate production of thinner lenses, in some instances, using thinner lens blanks. To illustrate, low-thickness portions of a lens blank and/or lens may be susceptible to vibration during machining, particularly when unsupported, which can lead to defects in and/or undesirable damage to the lens. in the present methods, less-aggressive parameter(s) can be used to machine such portions, thereby mitigating these issues, while more-aggressive parameter(s) can be used to machine other portions, thereby avoiding undue increases in machining time to produce the lens. Further, thinner lens blanks may require less time to machine than thicker lens blanks, and thinner lens blanks and/or lenses may include less raw material than thicker lens blanks and/or lenses; thus, by facilitating use of thinner lens blanks and/or production of thinner lenses, the present methods can save both time and cost.

For yet further example, the size and shape of a blocking material is often selected based on the amount of support needed by a lens blank to be supported by the blocking material and a lens to be produced from that lens blank, which can vary from lens blank to lens blank and from lens to lens. To illustrate, a smaller blocking material may provide sufficient support when machining a lens having a smaller cribbing diameter, but may not when machining a lens having a larger cribbing diameter. If a lens blank or a lens is insufficiently supported during machining, defects in or undesirable damage to the lens can occur (e.g., due to vibrations).

Typically, a multitude of blocking rings are available (e.g., of various diameters and thicknesses), each of which can be selected to produce a blocking material of a certain size and shape. While a set of blocking rings may be used to produce appropriately sized and shaped blocking materials for a range of lens blanks and lenses, the need for their use can frustrate automation. As a result, many blockers are manually-operated. In the present methods, at least by using less-aggressive parameter(s) to machine unsupported zone(s) of a lens blank when producing a lens, blocking material sizes and shapes that might otherwise provide insufficient support to the lens blank and/or the lens can be used, thereby reducing the number of blocking rings needed and promoting automation.

Figure 25:
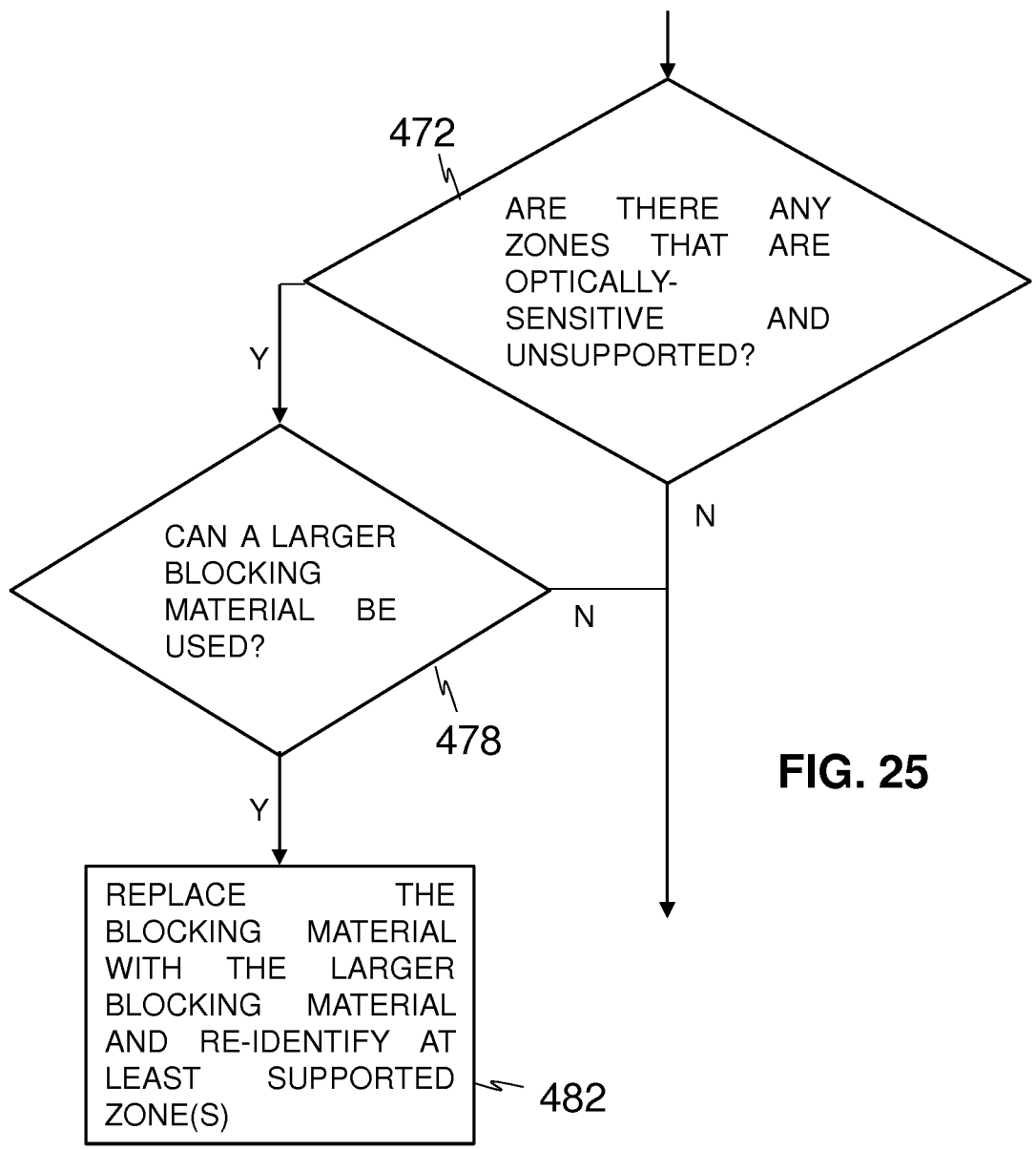
FIG. 25 is a flow chart showing methods for selecting a block for supporting the lens blank during production of the lens based on characteristic(s) of at least one of the zone(s).

Referring now to FIG. 25, some of the present methods can be used to select the blocking material. To illustrate, at step 472, it can be determined if there are any optically-sensitive and unsupported zones. If there are—and if a larger blocking material, such as one having a larger surface that contacts the lens blank, is usable (step 478)—the blocking material can be replaced with the larger blocking material, and at least supported zone(s) can be re-identified (step 478). A larger blocking material can be usable if, for example, a blocking ring for producing the larger blocking material is available. Such replacement and re-identification can include performing step 162 (FIG. 4) using a block shape that corresponds to the larger blocking material. In at least this way, the present methods can he used to select a blocking material that minimizes the size of optically-sensitive and unsupported zone(s). It will be understood that similar methods can be used to minimize the size of unsupported zone(s) that are high-complexity and/or underlie and/or overlie the component (e.g., in addition to or in lieu of being optically-sensitive).

Returning to FIG. 26, at step 118, the lens can be produced according to the parameter(s) of each of the zones. To illustrate, information can be provided to machining equipment (e.g., a generator, an edger, a polisher, an engraver, and/or the like), including: (1) for each of the zone(s), information indicative of the location of the zone within the lens blank as well as information indicative of parameter(s) for machining the lens blank in that zone; and (2) in some instances, baseline parameters and/or manufacturing preferences, which can be used by the machining equipment to determine parameter(s) for machining the lens blank as described above.

Figure 26:
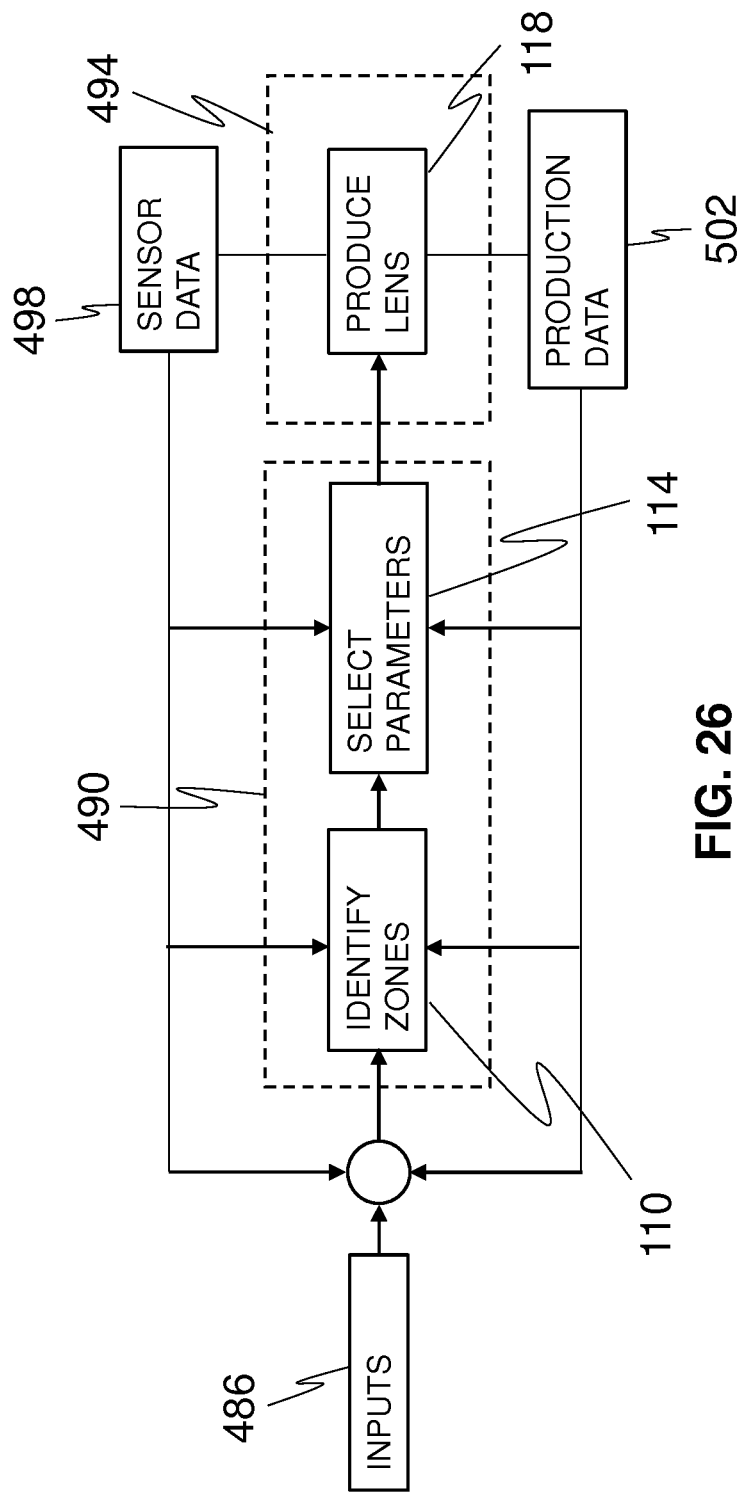
FIG. 26 is a flow chart showing methods for producing the lens.

Referring now to FIG. 26, shown is a method for producing the lens. Inputs 486 can include, for example, the spatial representation, which, as described above, can include information indicative of: (1) the lens blank's geometry; (2) the lens's geometry (e.g., the lens shape) and position within the lens blank; (3) the block's geometry (e.g., the block shape) and position relative to the lens blank; (4) the location of the distance vision portion (e.g., that of the distance reference point), the near vision portion (e.g., that of the near reference point), the progressive corridor, the lateral vision portions, the prism reference point, the fitting point, and/or the like; (5) the component's geometry (e.g., the component shape) and position relative to the lens blank; and/or the like.

As shown, steps 110 and 114 can be performed using one or more processors (e.g., 528, FIG. 28) of a lens design system 490. Step 118 can be performed using machining equipment of a lens production system 494, and, in some instances, with one or more processors (e.g., 528) of the lens production system. Lens design system 490 can be geographically remote from lens production system 494.

In some methods, sensor data 498 and/or production data 502 can be used to identify zone(s) and/or select parameter(s) for those zones. Such data can include, for example, measurements taken while producing a lens, data indicative of the state or wear of machining equipment implements or other consumables, data indicative of a time since machining equipment was last calibrated, data indicative of cosmetics and/or optical quality of produced lenses, and/or the like. To illustrate, if such data indicates that a machining equipment implement to be used is worn, or at least a threshold period of time has elapsed since the machining equipment was last calibrated, less aggressive parameter(s) for producing the lens can be selected. To further illustrate, such data can be used to identify patterns in a series of produced lenses (e.g., portions of the lenses having vibration marks, exhibiting breakage, and/or the like), and such patterns can be used to identify portions of a lens that are sensitive, characteristic(s) that render those portions sensitive, and what parameter(s) are suitable for processing those portions. In some methods, such data can be used to adjust parameter(s) for producing a lens during production of the lens; for example, if the data indicates the occurrence of vibrations, parameter(s) for producing the lens can he made less aggressive.

While the above methods are described with respect to ophthalmic lenses, the present methods can be used to produce other lenses, such as, for example, lenses for use in cameras, telescopes, lasers, and/or the like.

Figure 27:
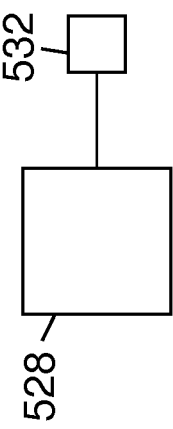
FIG. 27 depicts a processor and a memory that can be used to implement some of the present methods.

Referring additionally to FIG. 27, some of the present methods—such as any of those described above—can be implemented by one or more processors (e.g., processor 528), and instructions for performing the methods can be stored on a memory (e.g., 532) in communication with the processor(s). For example, the processor(s) can be configured to: (1) receive or generate a spatial representation (e.g., 126) of a lens blank (e.g., 10); (2) identify zone(s) within the spatial representation and relative to an ophthalmic lens (e.g., 14) to be produced from the lens blank (e.g., step 110, including any of its sub-steps); and (3) select, for each of the zones, one or more parameters for producing the lens (e.g., step 114, including any of its sub-steps). One(s) of these steps can be implemented by one(s) of the processor(s), and other(s) of these steps can be implemented by other(s) of the processor(s). In some instances, such processor(s) can control machining equipment (e.g., a generator, an edger, a polisher, and/or the like) to produce the lens according to the parameter(s) of each of the zone(s) (e.g., step 118, including any of its sub-steps). Such processor(s) can be those of a personal computer, a server, machining equipment, and/or the like.

Also disclosed are non-transitory computer-readable storage media (e.g., memory 532) storing instructions that, when executed by a processor (e.g., 528), cause the processor to perform some of the present methods, including step 110 (and any of its sub-steps), step 114 (and any of its sub-steps), and/or step 118 (and any of its sub-steps).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method implemented by a system for use in producing an ophthalmic lens, the method comprising:
    identifying, by at least one processor, a plurality of zones within a spatial representation of a lens blank, the zones being identified relative to an ophthalmic lens to be produced from the lens blank,
    the lens including:
        a front face,
        a back face, and
        an edge that connects the front face and the back face,
    and the zones including, for each of at least one of the front face and the back face of the lens:
        an interior zone bounded by an interior portion of the face,
        a peripheral zone bounded by a periphery of the face that surrounds the interior portion of the face, and
        a waste zone that is bounded by neither the front face nor the back face of the lens,
    wherein, for each of the plurality of zones, identifying the plurality of zones comprises at least one of:
    identifying at least one supported zone that overlies a blocking material that supports the lens blank during production of the lens, and
    identifying at least one optically-useful zone of the lens, and
    identifying at least one zone that overlies and underlies a component of the lens, and
    identifying at least one optically-sensitive zone; and
    selecting, by the at least one processor, for each of the zones, parameters for producing the lens, the parameters including:
        an implement for removing material from the lens blank, and;
        a rotational speed of the implement relative to the lens blank, and/or
        a translational speed of the implement relative to the lens blank, and/or
        a depth of cut of the implement into the lens blank, wherein the parameters for at least one first one of the zones differ from the parameters of at least one different second one of the zones; and producing the lens by removing material from the lens blank according to the parameters of each of the plurality of zones.

2. The method of claim 1, wherein, for the front face of the lens, the interior zone overlies, and/or, for the back face of the lens, the interior zone underlies:
 a fitting point of the lens;
 a prism reference point of the lens;
 a near reference point of the lens; and/or
 a distance reference point of the lens.

3. The method of claim 1, wherein, for the front face of the lens, the interior zone overlies, and/or, for the back face of the lens, the interior zone underlies:
 a near vision portion of the lens;
 a progressive corridor of the lens; and/or
 a distance vision portion of the lens.

4. The method of claim 1, wherein, for at least one of the peripheral zone(s):
 the implement differs from that for at least one of the interior zone(s); and/or
 the rotational speed of the implement relative to the lens blank, the translational speed of the implement relative to the lens blank, and/or the depth of cut of the implement into the lens blank is larger than that for at least one of the interior zone(s).

5. The method of claim 1, wherein, for the waste zone:
 the implement differs from that for at least one of the interior zone(s); and/or
 the rotational speed of the implement relative to the lens blank, the translational speed of the implement relative to the lens blank, and/or the depth of cut of the implement into the lens blank is larger than that for at least one of the interior zone(s).

6. The method of claim 1, wherein:
 one or more of the zones are identified relative to a blocking material that supports the lens blank during production of the lens; and
 the zones include:
  a supported zone that overlies the blocking material; and/or
  an unsupported zone that does not overlie the blocking material.

7. The method of claim 1, wherein the zones include, for each of at least one of the front face and the back face of the lens:
 a low-thickness zone bounded by a portion of the face at a first portion of the lens that has a first thickness; and
 a high-thickness zone bounded by a portion of the face at a second portion of the lens that has a second thickness that is larger than the first thickness.

8. The method of claim 1, wherein:
 one or more of the zones are identified relative to a component that is disposed within the lens blank.

9. The method of claim 1, wherein the zones include, for each of at least one of the front face and the back face of the lens:
 a high-complexity zone; and
 a low-complexity zone;
  wherein the high-complexity zone is bounded by a portion of the face having one or more characteristics, each being higher than the same characteristic(s) of a portion of the face that bounds the low-complexity zone, the characteristic(s) including: a radius of curvature, a slope, an acceleration, and/or a jerk.

10. The method of claim 1, wherein the zones include at least one zone that is defined within an overlap between at least two others of the zones.

11. The method of claim 1, wherein, for at least one of the front face and the back face of the lens, selecting the parameters for the interior zone and/or the peripheral zone is performed, based at least in part, on a radius of curvature, a slope, an acceleration, and/or a jerk of the face.

12. The method of claim 1, wherein, for at least one of the zones, the implement comprises a cutting implement or a polishing implement.

13. The method of claim 1, wherein selecting the parameters for each of the zones is performed before producing the lens.

14. The method of claim 2, wherein, for the front face of the lens, the interior zone overlies, and/or, for the back face of the lens, the interior zone underlies:
 a near vision portion of the lens;
 a progressive corridor of the lens; and/or
 a distance vision portion of the lens.

15. The method of claim 2, wherein, for at least one of the peripheral zone(s):
 the implement differs from that for at least one of the interior zone(s); and/or
 the rotational speed of the implement relative to the lens blank, the translational speed of the implement relative to the lens blank, and/or the depth of cut of the implement into the lens blank is larger than that for at least one of the interior zone(s).

16. The method of claim 3, wherein, for at least one of the peripheral zone(s):
 the implement differs from that for at least one of the interior zone(s); and/or
 the rotational speed of the implement relative to the lens blank, the translational speed of the implement relative to the lens blank, and/or the depth of cut of the implement into the lens blank is larger than that for at least one of the interior zone(s).

17. The method of claim 2, wherein, for the waste zone:
 the implement differs from that for at least one of the interior zone(s); and/or
 the rotational speed of the implement relative to the lens blank, the translational speed of the implement relative to the lens blank, and/or the depth of cut of the implement into the lens blank is larger than that for at least one of the interior zone(s).

18. The method of claim 1, wherein:
 the one or more of the zones are identified relative to a component that is disposed within the lens blank; and
 the component comprises a polar film or wafer, a display, or a waveguide.

19. A system for use in producing an ophthalmic lens, the system comprising:
 at least one processor configured to:
 receive a spatial representation of a lens blank and a lens to be produced from the lens blank, the lens having:
  a front face,
  a back face, and
  an edge that connects the front face and the back face;
 identify a plurality of zones within the spatial representation, the zones including, for each of at least one of the front face and the back face of the lens:
  an interior zone bounded by an interior portion of the face, a peripheral zone bounded by a periphery of the face that surrounds the interior portion of the face, and a waste zone that is bounded by neither the front face nor the back face of the lens, wherein to identify the plurality of zones, the at least one processor:

identifies at least one supported zone that overlies a blocking material that supports the lens blank during production of the lens, and identifies at least one optically-useful zone of the lens, and identifies at least one zone that overlies and/or underlies a component of the lens, and identifies at least one optically-sensitive zone; and select, foreach of the zones, parameters for producing the lens, the parameters including an implement for removing material from the lens blank, and:

a rotational speed of the implement relative to the lens blank, and/or a translational speed of the implement relative to the lens blank, and/or a depth of cut of the implement into the lens blank.

20. The system of claim 19, further comprising:

a lens generator configured to:

receive the parameters for each of the zones; and produce the lens by removing material from the lens blank according to the parameters of each of the zones.

\* \* \* \* \*